US012600374B2

(12) United States Patent
Park et al.

(10) Patent No.:     US 12,600,374 B2
(45) Date of Patent:     Apr. 14, 2026

(54) APPARATUS FOR CONTROLLING AUTONOMOUS DRIVING AND METHOD THEREOF

(71) Applicants: Hyundai Motor Company, Seoul (KR); Kia Corporation, Seoul (KR)

(72) Inventors: Chi Hong Park, Seoul (KR); Dae Young Kim, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 314 days.

(21) Appl. No.: 18/517,501

(22) Filed: Nov. 22, 2023

(65) Prior Publication Data

US 2024/0336274 A1      Oct. 10, 2024

(30) Foreign Application Priority Data

Apr. 10, 2023     (KR) ........................ 10-2023-0046872

(51) Int. Cl.

| | |
|---|---|
| *B60W 50/14* | (2020.01) |
| *B60N 2/10* | (2006.01) |
| *B60R 21/01* | (2006.01) |
| *B60R 21/015* | (2006.01) |
| *B60W 30/14* | (2006.01) |
| *B60W 30/182* | (2020.01) |
| *B60W 50/08* | (2020.01) |
| *B60W 60/00* | (2020.01) |

(52) U.S. Cl.

CPC .............. *B60W 50/14* (2013.01); *B60N 2/10* (2013.01); *B60R 21/01544* (2014.10); *B60W 30/146* (2013.01); *B60W 30/182* (2013.01);

*B60W 50/082* (2013.01); *B60W 60/0053* (2020.02); *B60R 2021/01265* (2013.01); *B60W 2050/146* (2013.01)

(58) Field of Classification Search

CPC ....... G08B 13/246; G01S 15/08; G01S 15/89; G07G 3/003

See application file for complete search history.

(56) References Cited

U.S. PATENT DOCUMENTS

| | | |
|---|---|---|
| 2011/0054756 A1 | 3/2011 | Hecker et al. |
| 2016/0231743 A1* | 8/2016 | Bendewald ............ B60K 35/60 |
| 2022/0169288 A1 | 6/2022 | Kim |

FOREIGN PATENT DOCUMENTS

| | | |
|---|---|---|
| KR | 102396993 B1 | 5/2022 |
| KR | 10-2022-0074568 A | 6/2022 |
| WO | 2009/124739 A1 | 10/2009 |

* cited by examiner

*Primary Examiner* — Brian A Zimmerman
*Assistant Examiner* — Cal J Eustaquio
(74) *Attorney, Agent, or Firm* — Banner & Witcoff, Ltd.

(57)     ABSTRACT

Disclosed is a device for controlling autonomous driving. For example, the device detects an event that causes a determination of whether to transfer control of a host vehicle to a user while the host vehicle operates in an autonomous driving mode, outputs a first notification based on not receiving a user response associated with the transfer of control, outputs a second notification based on not receiving the user response associated with the transfer of control, and control the host vehicle to reduce a travel speed of the host vehicle at a first rate.

20 Claims, 12 Drawing Sheets

```
┌─────────────────────────────────────┐
│   AUTONOMOUS DRIVING                  │
│   CONTROL DEVICE 100                  │
│                                       │
│  ┌─────────────────────────────────┐ │
│  │ NOTIFICATION DEVICE 110         │ │
│  └─────────────────────────────────┘ │
│                                       │
│  ┌─────────────────────────────────┐ │
│  │     CONTROLLER 120              │ │
│  └─────────────────────────────────┘ │
│                                       │
│  ┌─────────────────────────────────┐ │
│  │      MEMORY 130                 │ │
│  └─────────────────────────────────┘ │
│                                       │
│  ┌─────────────────────────────────┐ │
│  │   DISPLAY DEVICE 140            │ │
│  └─────────────────────────────────┘ │
└─────────────────────────────────────┘
```

AUTONOMOUS DRIVING
CONTROL DEVICE 100

NOTIFICATION DEVICE 110

CONTROLLER 120

MEMORY 130

DISPLAY DEVICE 140

APPARATUS FOR CONTROLLING AUTONOMOUS DRIVING AND METHOD THEREOF

CROSS-REFERENCE TO RELATED APPLICATION

This application claims the benefit of priority to Korean Patent Application No. 10-2023-0046872, filed in the Korean Intellectual Property Office on Apr. 10, 2023, the entire contents of which are incorporated herein by reference.

TECHNICAL FIELD

The present disclosure relates to a device and a method for controlling autonomous driving, and more specifically, to a technology for providing information regarding a transfer of control from an autonomous driving vehicle to a user.

BACKGROUND

As autonomous vehicles are more widely adopted, various technologies related to autonomous driving are being developed. Autonomous driving may be classified into partial driving automation, conditional driving automation, high driving automation, and/or full driving automation based on a level of control thereof.

In one example, under a certain traveling condition of a host vehicle, control of the host vehicle may need to be transferred to a user during autonomous driving control of the host vehicle. For example, in a certain situation, a driving mode of the host vehicle may need to be switched from an autonomous driving mode to a manual driving mode. Accordingly, an autonomous driving control device may display a notification regarding the transfer of control of the host vehicle to the user.

The autonomous driving control device may use various components to inform the user of the need to change the driving mode of the host vehicle. For example, while the host vehicle is traveling, the autonomous driving control device may provide a haptic warning to the user by changing acceleration by applying varying amounts of braking force. Therefore, the user may recognize via the haptic warning that the user has to take control of the host vehicle. As another example, the autonomous driving control device may provide the notification regarding the transfer of control using an actuator disposed in a seat of the host vehicle. In particular, the autonomous driving control device may indicate, by generating vibration using the actuator, that transfer of control of the host vehicle to the user is imminent.

However, changing the acceleration by applying varying amounts of braking force on at least one of the wheels may cause the user to feel discomfort while traveling. Additionally, installing an actuator in a seat may increase the manufacturing cost of the host vehicle because of the cost required to install and add the actuator to the seat.

SUMMARY

The present disclosure has been made to solve the above-mentioned problems occurring in the prior art while advantages achieved by the prior art are maintained intact.

An aspect of the present disclosure provides a device and a method for controlling autonomous driving that, when a need for a transfer of control is recognized, provide a notification using different periods, intensities, or any combination thereof to a user in a stepwise manner using a notification device.

Another aspect of the present disclosure provides a device and a method for controlling autonomous driving that intuitively provide notification of a transfer of control by adaptively adjusting a length of a seat belt worn by a user using a notification device. The notification device may be a seat belt length adjusting apparatus.

Another aspect of the present disclosure provides a device and a method for controlling autonomous driving that intuitively provide notification of a transfer of control by adaptively adjusting an angle of a seat where a user is seated using a seat angle adjusting apparatus included in a notification device.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, an autonomous driving control device may include: a notification device including at least one of: a seat belt length adjusting device or a seat angle adjusting device; memory for storing one or more instructions; and a controller operatively connected to the notification device and the memory. The one or more instructions, when executed by the controller, may cause the autonomous driving control device to: detect, while a host vehicle operates in an autonomous driving mode, an event that causes a determination of whether to transfer control of the host vehicle to a user; output, at a first time and via the notification device, a first notification based on not receiving, within a first time period, a user response associated with the transfer of control; output, via the notification device, a second notification based on not receiving, within a second time period starting at the first time, the user response associated with the transfer of control; and control, after outputting the second notification, the host vehicle to reduce a travel speed of the host vehicle at a first rate.

The autonomous driving control device may further include a display. The one or more instructions, when executed by the controller, may further cause the autonomous driving control device to provide, via the display, information on at least one of: the event, the first notification, or the second notification.

The one or more instructions, when executed by the controller, may cause the autonomous driving control device to output, via the notification device, the second notification further based on an occurrence, while the host vehicle operates in the autonomous driving mode, of at least one of: an error of the autonomous driving control device, or an unpredictable event.

The one or more instructions, when executed by the controller, may cause the autonomous driving control device to control, after outputting the second notification, the host vehicle to reduce the travel speed of the host vehicle at a second rate greater than the first rate.

The one or more instructions, when executed by the controller, may cause the autonomous driving control device to: output the first notification by controlling, via the seat belt length adjusting device, a length of a seat belt during a third time period, or output the second notification by controlling, via the seat belt length adjusting device, the length of the seat belt during a fourth time period. The third time period may include a first retraction period, for contracting the length of the seat belt, and a first idle period. The fourth time period may be less than the third time period. The fourth time period may include a second retraction period, for contracting the length of the seat belt, and a second idle period.

The one or more instructions, when executed by the controller, may cause the autonomous driving control device to: output, via the seat belt length adjusting device, the first notification by controlling a length of a seat belt with first intensity; or output, via the seat belt length adjusting device, the second notification by controlling the length of the seat belt with second intensity greater than the first intensity.

The one or more instructions, when executed by the controller, may cause the autonomous driving control device to: output, via the seat angle adjusting device, the first notification by controlling an angle of a seat during a third time period; or output, via the seat angle adjusting device, the second notification by controlling the angle of the seat during a fourth time period. The fourth time period may be less than the third time period.

The one or more instructions, when executed by the controller, may cause the autonomous driving control device to: output, via the seat angle adjusting device, the first notification by controlling an angle of a seat within a first range; or output, via the seat angle adjusting device, the second notification by controlling the angle of the seat within a second range greater than the first range.

The one or more instructions, when executed by the controller, may further cause the autonomous driving control device to turn off the notification device and deactivate the autonomous driving mode based on receiving, within the first time period or the second time period, the user response associated with the transfer of control.

The one or more instructions, when executed by the controller, may further cause the autonomous driving control device to transmit a control signal for controlling the notification device. The control signal may include at least one of: a ramp-up signal, a step signal, or a sinusoidal signal.

The one or more instructions, when executed by the controller, may further cause the autonomous driving control device to: determine, based on the event, whether a seat belt of the user is fastened; based on not receiving, within the first time period, the user response associated with the transfer of control: output, via the notification device, the first notification based on a determination that the seat belt is fastened; and control the host vehicle to reduce the travel speed of the host vehicle at the second rate based on a determination that the seat belt is not fastened.

The one or more instructions, when executed by the controller, may further cause the autonomous driving control device to: receive, after outputting at least one of the first notification or the second notification, a manual seat angle adjustment input from the user; and deactivate the autonomous driving mode for the host vehicle based on a duration of the manual seat angle adjustment input exceeding a threshold time period.

The user response may include at least one of, lasting over a threshold time period: manipulation of a steering wheel of the host vehicle, a pressure on a pedal of the host vehicle, a touch input on a display of the host vehicle, or a manual seat angle adjustment input.

According to one or more example embodiments of the present disclosure, a method for controlling autonomous driving may include: detecting, by a controller and while a host vehicle operates in an autonomous driving mode, an event requiring a transfer of control of the host vehicle to a user; outputting, by the controller via a notification device and at a first time, a first notification based on not receiving, within a first time period, a user response associated with the transfer of control; outputting, by the controller via the notification device, a second notification based on not receiving, within a second time period starting at the first time, the user response associated with the transfer of control; and controlling, after outputting the second notification, the host vehicle to reduce a travel speed of the host vehicle at a first rate.

Outputting the second notification may include outputting, via the notification device, the second notification further based on an occurrence, while the host vehicle operates in the autonomous driving mode, of at least one of: an error of an autonomous driving control device, or an unpredictable event.

Outputting the second notification may further include: controlling, by the controller and after outputting the second notification, the host vehicle to reduce the travel speed of the host vehicle at a second rate greater than the first rate.

Outputting the first notification may include: outputting, by the controller, the first notification by controlling, via a seat belt length adjusting device, a length of a seat belt during a third time period, or outputting, by the controller, the second notification by controlling, via the seat belt length adjusting device, the length of the seat belt during a fourth time period. The third time period may include a first retraction period, for contracting the length of the seat belt, and a first idle period. The fourth time period may be less than the third time period. The fourth time period may include a second retraction period, for contracting the length of the seat belt, and a second idle period.

Outputting the second notification may include: outputting, by the controller, the first notification by controlling a length of a seat belt with first intensity; or outputting, by the controller, the second notification by controlling the length of the seat belt with second intensity greater than the first intensity.

Outputting the first notification may include: outputting, by the controller, the first notification by controlling an angle of a seat during a third time period; or outputting, by the controller, the second notification by controlling the angle of the seat during a fourth time period. The fourth time period may be less than the third time period.

Outputting the second notification may include: outputting, by the controller, the first notification by controlling an angle of a seat within a first range; or outputting, by the controller, the second notification by controlling the angle of the seat within a second range greater than the first range.

BRIEF DESCRIPTION OF THE DRAWINGS

The above and other objects, features and advantages of the present disclosure will be more apparent from the following detailed description taken in conjunction with the accompanying drawings.

With regard to the description of the drawings, the same or similar reference numerals may be used for the same or similar components.

DETAILED DESCRIPTION

Figure 1:
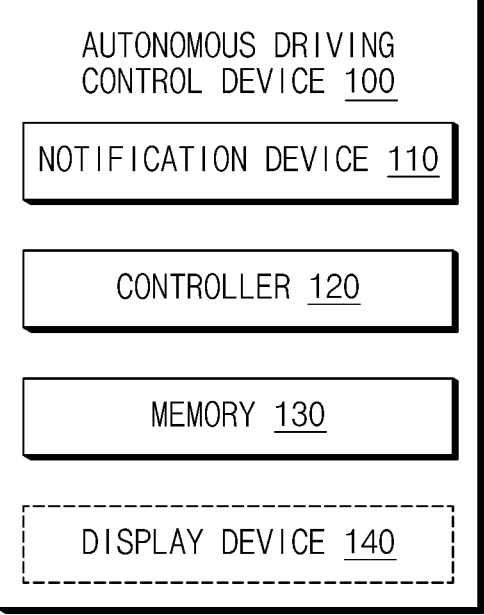
FIG. 1 is a block diagram showing components of an autonomous driving control device.

Hereinafter, one or more example embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the example embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly sense unless expressly so defined herein.

Hereinafter, one or more example embodiments of the present disclosure will be described in detail with reference to FIGS. 1 to 11.

FIG. 1 is a block diagram showing components of an autonomous driving control device.

An autonomous driving control device 100 may include at least one of a notification device 110, a controller 120, a memory 130, a display device 140, or any combination thereof. A configuration of the autonomous driving control device 100 shown in FIG. 1 is an example and embodiments of the present disclosure are not limited thereto. For example, the autonomous driving control device 100 may further include components (e.g., at least one of an interface device, a communication device, a sensor device, or any combination thereof) not shown in FIG. 1.

The notification device 110 may include at least one notification apparatus and may provide a notification to a user.

For example, the notification device 110 may include a seat belt length adjusting apparatus. For example, the seat belt length adjusting apparatus may perform a seat belt length adjustment of winding or extending a seat belt corresponding to at least one seat of a host vehicle.

For example, the notification device 110 may include a seat angle adjusting apparatus. For example, the seat angle adjusting apparatus may perform a seat angle adjusting function of reclining or raising at least one seat of the host vehicle.

For example, the notification device 110 may perform the notification function of various steps in response to control of the controller 120. For example, the notification device 110 may perform the notification function of a plurality of steps in which one of an intensity, a period, or any combination thereof is differently applied to the seat belt length adjusting function using the seat belt length adjusting apparatus. For example, the notification device 110 may perform the notification function of a plurality of steps in which at least one of an angle range, an angle change period, or any combination thereof is differently applied to the seat angle adjusting function using the seat angle adjusting apparatus.

For example, the notification device 110 may selectively transmit a first step notification and/or a second step notification.

For example, the first step notification may include an operation of controlling a length of the seat belt with a first intensity based on a first period using the seat belt length adjusting apparatus. The first period may include, for example, a first retraction section in which the seat belt is wound with the first intensity and a first idle section. The first retraction section and/or the first idle section may be set values changeable by the user and/or a producer.

For example, the second step notification may include an operation of controlling the length of the seat belt with a second intensity greater than the first intensity based on a second period smaller than the first period using the seat belt length adjusting apparatus. The second period may include, for example, a second retraction section in which the seat belt is wound with the second intensity and a second idle section. The second retraction section and/or the second idle section may be set values changeable by the user and/or the producer.

For example, the first step notification may include an operation of controlling an angle of the seat in a first angle section based on a third period using the seat angle adjusting apparatus. The first step notification using the seat angle adjusting apparatus may include, for example, an operation of gradually and repeatedly changing the angle of the seat from a minimum value to a maximum value of the first angle section. The third period may be a set value changeable by the user and/or the producer.

For example, the second step notification may include an operation of controlling the angle of the seat in a second angle section greater than the first angle section based on a fourth period smaller than the third period using the seat angle adjusting apparatus. The second step notification using the seat angle adjusting apparatus may include an operation of gradually and repeatedly changing the angle of the seat from a minimum value to a maximum value of the second angle section. The fourth period may be a set value changeable by the user and/or the producer.

For example, the notification device 110 may perform the notification function in response to various types of control signals. For example, the notification device 110 may perform some of the plurality of steps of the notification function in response to the control signal including at least one of a ramp-up signal, a step signal, a sinusoidal signal, or any combination thereof.

The controller 120 may be operatively connected to the notification device 110, the memory 130, and/or the display device 140. For example, the controller 120 may control operations of the notification device 110, the memory 130, and/or the display device 140.

For example, the controller 120 may control the host vehicle in an autonomous driving mode based on one of a plurality of autonomous driving steps. For example, the controller 120 may identify that an event related to a transfer of control (e.g., control authority, control rights, control privilege, etc.) of the host vehicle has occurred while controlling the host vehicle in the autonomous driving mode based on a specified autonomous driving step (e.g., a level 3).

For example, the event related to the transfer of the control of the host vehicle may include information on a travel situation of the host vehicle. For example, the event may include at least one of a traffic volume of a road on which the host vehicle is traveling, a travel speed of the host vehicle, a travel state of a preceding vehicle of the host vehicle, or any combination thereof. For example, the event may include predefined reference parameters. In other words, the event may include various information on the travel situation of the host vehicle stored in advance.

For example, based on the identification of the occurrence of the event, when not receiving a response regarding the transfer of the control from the user for a first time period (e.g., 4 seconds), the controller 120 may transmit the first step notification using the notification device 110. For example, when receiving the response from the user for the first time period, the controller 120 may turn off the notification device 110, transfer the control of the host vehicle to the user, and terminate autonomous driving control of the host vehicle.

For example, when not receiving the response regarding the transfer of the control from the user for a second time period (e.g., 6 seconds) from a time point of transmitting the first step notification, the controller 120 may transmit the second step notification using the notification device 110. For example, when receiving the response from the user for the second time period, the controller 120 may turn off the notification device 110, transfer the control of the host vehicle to the user, and terminate the autonomous driving control of the host vehicle.

For example, the response regarding the transfer of the control may include at least one of control (e.g., manipulation, adjustment, tug, etc.) of a steering wheel of the host vehicle, a pressure on an accelerator pedal and/or a brake pedal of the host vehicle, a touch input on a display of the host vehicle, a manual seat angle adjustment input that lasts beyond a predefined time period, or any combination thereof.

For example, the controller 120 may control the travel speed of the host vehicle while transmitting the second step notification using the notification device 110. For example, while the second step notification is being transmitted, the controller 120 may control the host vehicle based on a first minimum risk maneuver (MRM) of reducing the travel speed of the host vehicle at a first acceleration (e.g., $-1$ m/s$^2$).

For example, the controller 120 may provide various information on driving control of the host vehicle to the user using the display device 140. For example, the controller 120 may provide the user with information on at least one of the event related to the transfer of the control, t the first step notification, the second step notification, information on whether the autonomous driving mode is deactivated, or any combination thereof via visual and/or auditory content using the display device 140.

For example, the controller 120 may identify an emergency situation while controlling the host vehicle in the autonomous driving mode based on the specified autonomous driving step. For example, the emergency situation may include a situation different from the above-described event related to the transfer of the control. In other words, the emergency situation may include a travel situation that has not been stored in advance. For example, the emergency situation may include at least one of an operation error of the autonomous driving control device 100, an unpredictable situation (e.g., an occurrence of an accident, a line departure, an occurrence of an intruding vehicle, a change in an external environment, or any combination thereof) related to the travel of the host vehicle, or any combination thereof.

For example, when the emergency situation is identified, the controller 120 may skip a waiting time of the first time period and/or the transmission of the first step notification and immediately transmit the second step notification. For example, while transmitting the second step notification based on the occurrence of the emergency situation, the controller 120 may control the host vehicle based on a second MRM of reducing the travel speed of the host vehicle at a second acceleration (e.g., $-4$ m/s$^2$) greater than the first acceleration.

The above-described numerical values illustrated for the first time period, the second time period, the first acceleration, and the second acceleration are merely exemplary, and the present disclosure are not limited thereto. For example, the second acceleration may be $-5$ m/s$^2$. For example, the first time period and the second time period may be set values changeable by settings of the user and/or a manufacturer.

The memory 130 may store commands or data. For example, the memory 130 may store one or more instructions that allow the autonomous driving control device 100 to perform the various operations when executed by the controller 120.

For example, the memory 130 and the controller 120 may be implemented as one chipset. The controller 120 may include at least one of a communication processor or a modem.

For example, the memory 130 may store various information on the autonomous driving control device 100. For example, the memory 130 may store information on an operation history of the controller 120. For example, the memory 130 may store information on a state and/or an operation of components (e.g., at least one of an engine control unit (ECU), the notification device 110, the controller 120, the display device 140, or any combination thereof) of the host vehicle.

The display device 140 may include at least one output device. For example, the display device 140 may include the output device (e.g., a display and/or a speaker) included in at least a portion of an interior of the host vehicle.

For example, the display device 140 may provide the various information on the travel situation of the host vehicle to the user via visual and/or auditory content.

For example, the display device 140 may output information on various travel information (e.g., at least one of the event related to the transfer of the control, the emergency situation, or any combination thereof) generated while the host vehicle is traveling in the autonomous driving mode in real time.

For example, the display device 140 may output information on the notification function performed via the notification device 110 in real time under the control of the controller 120.

9

Figure 2:
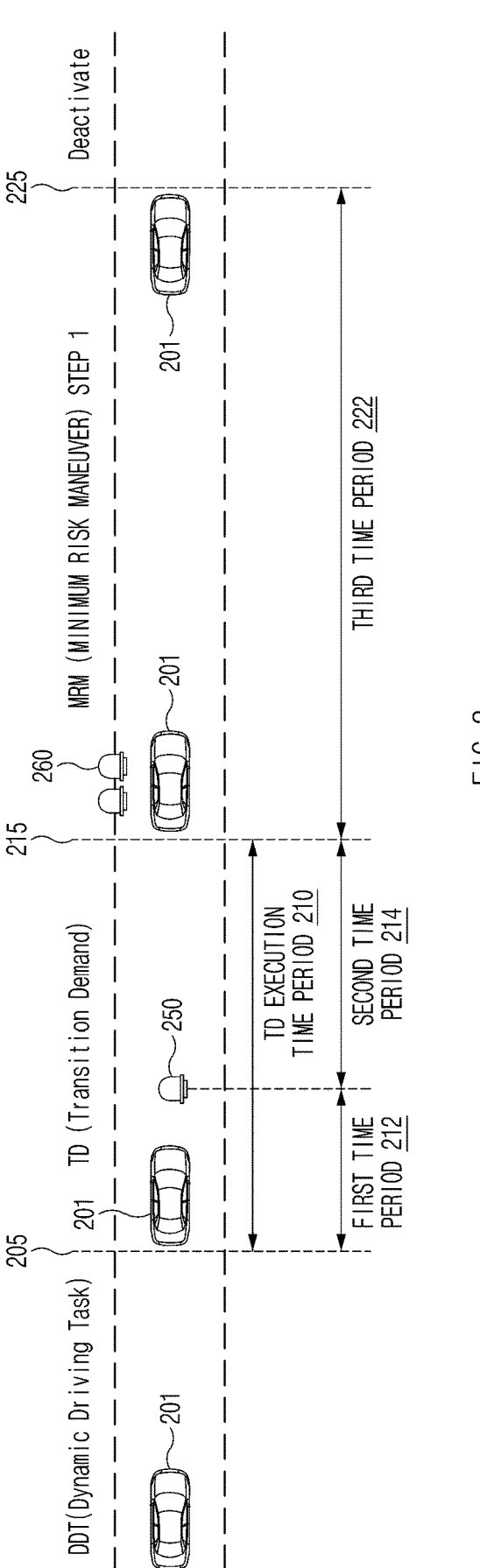
FIG. 2 is a conceptual diagram of an operation of an autonomous driving control device.

FIG. 2 is a conceptual diagram of an operation of an autonomous driving control device.

An autonomous driving control device (e.g., the autonomous driving control device 100 in FIG. 1) may control a host vehicle 201 in an autonomous driving mode. For example, the autonomous driving control device may control the host vehicle 201 in the autonomous driving mode based on an autonomous driving step equal to or higher than a specified step (e.g., a level 3).

While controlling the host vehicle 201 in the autonomous driving mode based on the autonomous driving mode (e.g., a dynamic driving task (DDT)), the autonomous driving control device may identify at a first time point 205 that an event related to a transfer of control of the host vehicle 201 has occurred.

The autonomous driving control device may display information on the transfer of the control to a user based on the identification of the occurrence of the event at the first time point 205. For example, the autonomous driving control device may provide, to the user via a display device (e.g., the display device 140 in FIG. 1), various information indicating that control by the user is required.

If a response regarding the transfer of control from the user is not received during a first time period 212, the autonomous driving control device may transmit a first step notification 250 using a notification device (e.g., the notification device 110 in FIG. 1). For example, when receiving the response regarding the transfer of the control from the user for the first time period 212, the autonomous driving control device may transfer the control of the host vehicle 201 to the user and terminate the control in the autonomous driving mode.

For example, the first step notification 250 may include a notification function using a seat belt length adjusting apparatus and/or a seat angle adjusting apparatus included in the notification device.

For example, the first step notification 250 may include an operation of controlling a length of a seat belt with a first intensity based on a first period using the seat belt length adjusting apparatus. The first period may include, for example, a first retraction section in which the seat belt is wound with the first intensity and a first idle section. The first retraction section and/or the first idle section may be set values changeable by the user and/or a producer.

For example, the first step notification 250 may include an operation of controlling an angle of the seat in a first angle section based on a third period using the seat angle adjusting apparatus. The first step notification 250 using the seat angle adjusting apparatus may include, for example, an operation of gradually and repeatedly changing the angle of the seat from a minimum value to a maximum value of the first angle section. The third period may be a set value changeable by the user and/or the producer.

For example, the first step notification 250 may be transmitted on the premise that the autonomous driving control device identifies that the user is seated with the seat belt fastened. In other words, the autonomous driving control device may continuously identify whether the seat belt is fastened after the first time point 205, and when it is identified that the user is seated with the seat belt fastened, normally transmit the first step notification 250.

For example, the autonomous driving control device may immediately control the host vehicle 201 based on a minimum risk maneuver (MRM) when it is identified that the user is seated with the seat belt not fastened or the user unfastens the seat belt at any time point in the first time period 212 or a second time period 214. In other words, when it is identified that the user is seated with the seat belt not fastened, the autonomous driving control device may skip the transmission of the first step notification 250 and immediately perform the MRM-based control of the host vehicle 201. For example, while performing the MRM-based control of the host vehicle 201 based on whether the seat belt is fastened, the autonomous driving control device may visually and/or audibly provide information on the seat belt to the user. The information on the seat belt may include at least one of a seat belt fastening guide, a seat belt fastened state, MRM activation information resulted from the unfastening of the seat belt, or any combination thereof. For example, even when the user fastens the seat belt again after performing the MRM-based control of the host vehicle 201 based on whether the seat belt is fastened, the autonomous driving control device may continue to perform the MRM-based control of the host vehicle 201. For example, when receiving the response regarding the transfer of the control from the user after performing the MRM-based control of the host vehicle 201 based on whether the seat belt is fastened, the autonomous driving control device may transfer the control of the host vehicle 201 to the user and terminate the control in the autonomous driving mode.

If the response associated with the transfer of control is not received from the user during the second time period 214 starting at a time of transmitting (e.g., outputting) the first notification 250, the autonomous driving control device may transmit a second step notification 260 using the notification device. For example, when receiving the response regarding the transfer of the control from the user for the second time period 214, the autonomous driving control device may transfer the control of the host vehicle 201 to the user and terminate the control in the autonomous driving mode.

For example, the second step notification 260 may include the notification function using the seat belt length adjusting apparatus and/or the seat angle adjusting apparatus included in the notification device.

For example, the second step notification 260 may include an operation of controlling the length of the seat belt with a second intensity greater than the first intensity based on a second period smaller than the first period using the seat belt length adjusting apparatus. The second period may include, for example, a second retraction section in which the seat belt is wound with the second intensity and a second idle section. The second retraction section and/or the second idle section may be set values changeable by the user and/or the producer.

For example, the second step notification 260 may include an operation of controlling the angle of the seat in a second angle section greater than the first angle section based on a fourth period smaller than the third period using the seat angle adjusting apparatus. The second step notification 260 using the seat angle adjusting apparatus may include an operation of gradually and repeatedly changing the angle of the seat from a minimum value to a maximum value of the second angle section. The fourth period may be a set value changeable by the user and/or the producer.

A time period from the first time point 205, which is the time point at which the event related to the transfer of the control has occurred, to a second time point 215, which is the time point at which the second step notification 260 is transmitted, may be defined as a transition demand (TD) execution time period 210. For example, the TD execution time period 210 may be defined as a limit time period for informing the user that the transfer of the control is necessary. After the limit time period passes, the autonomous driving control device may reduce a travel speed of the host vehicle 201.

While transmitting the second step notification 260, the autonomous driving control device may control the host vehicle 201 based on a first MRM (or an MRM step 1) including an operation of reducing the travel speed of the host vehicle 201 at a first acceleration.

The autonomous driving control device may reduce the travel speed of the host vehicle 201 for a third time period 222, which is a time period from the second time point 215, which is the time point at which the second step notification 260 is transmitted, to a third time point 225 at which the travel speed of the host vehicle 201 becomes a value equal to or smaller than a specified value (e.g., 0 m/s). In addition, the autonomous driving control device may provide the user with at least one of a travel situation of the host vehicle 201, control transfer required information, or any combination thereof using the display device via visual and/or auditory content.

The autonomous driving control device may receive a manual seat angle adjustment input from the user while transmitting the first step notification 250 or the second step notification 260.

For example, while transmitting the first step notification 250 or the second step notification 260 using the seat angle adjusting apparatus, the autonomous driving control device may receive the manual seat angle adjustment input that lasts for a specific time period from the user.

For example, when the specific time period for which the manual seat angle adjustment input lasts exceeds a predefined time period, the autonomous driving control device may identify the corresponding manual seat angle adjustment input as a response will of the user regarding the transfer of the control, and terminate (or release) autonomous driving control for the host vehicle 201.

For example, when the specific time period during which the manual seat angle adjustment input lasts is equal to or smaller than the predefined time period, the autonomous driving control device may continuously transmit the notification or perform the autonomous driving control.

If the response associated with the transfer of control is not received until the third time 225, the autonomous driving control device may terminate the travel of the host vehicle 201. For example, the autonomous driving control device may reduce the travel speed of the host vehicle 201 to 0 and deactivate driving of the host vehicle 201 and/or the autonomous driving control of the autonomous driving control device.

Figure 3:
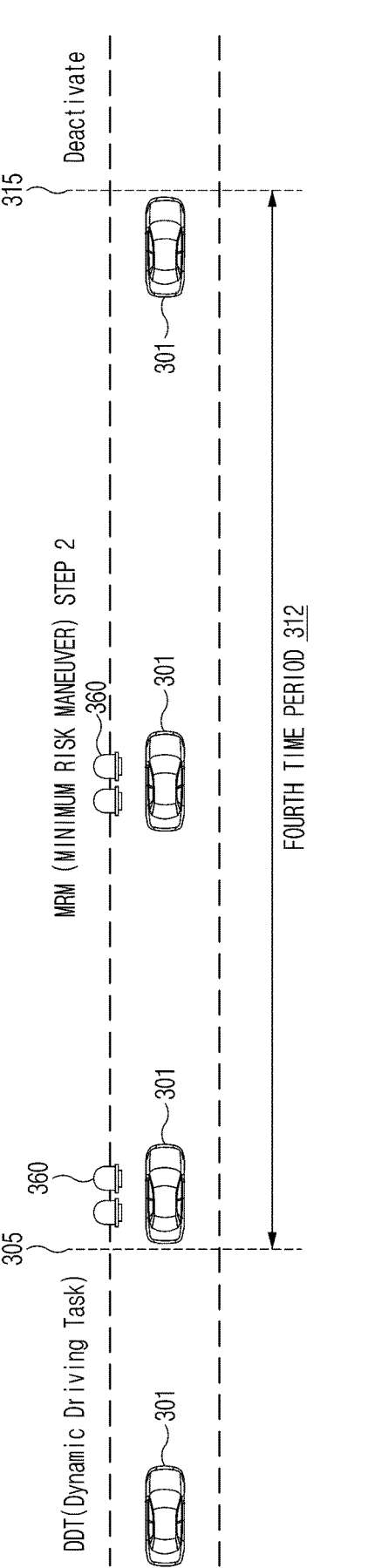
FIG. 3 is a conceptual diagram of an operation of an autonomous driving control device.

FIG. 3 is a conceptual diagram of an operation of an autonomous driving control device.

An autonomous driving control device (e.g., the autonomous driving control device 100 in FIG. 1) may control a host vehicle 301 in an autonomous driving mode. For example, the autonomous driving control device may control the host vehicle 301 in the autonomous driving mode based on an autonomous driving step equal to or higher than a specified step (e.g., a level 3).

While controlling the host vehicle 301 in the autonomous driving mode based on the autonomous driving mode (e.g., a dynamic driving task (DDT)), the autonomous driving control device may identify at a first time point 305 that an emergency situation has occurred. For example, the emergency situation may include a situation that is different from the event related to the transfer of the control in FIG. 2 described above. In other words, the emergency situation includes a travel situation that has not been stored in advance. For example, the emergency situation may include at least one of an operation error of the autonomous driving control device, an unpredictable situation (e.g., an occurrence of an accident, a line departure, an occurrence of an intruding vehicle, a change in an external environment, or any combination thereof) related to travel of the host vehicle 301, or any combination thereof.

If the emergency situation is identified, the autonomous driving control device may skip a waiting time of a first time period and/or transmission of a first step notification, and immediately transmit a second step notification 360 at the first time point 305 at which the emergency situation has occurred. For example, while transmitting a second step notification 360 based on the occurrence of the emergency situation, the autonomous driving control device may control the host vehicle 301 based on a second MRM (or an MRM step 2) of reducing a travel speed of the host vehicle 301 at a second acceleration greater than a first acceleration.

For a total of a fourth time period 312 from the first time point 305 to a second time point 315, the autonomous driving control device may reduce the travel speed of the host vehicle 301 at the second acceleration. When not receiving a response regarding the transfer of the control until the second time point 315, the autonomous driving control device may terminate the travel of the host vehicle 301. For example, the autonomous driving control device may reduce the travel speed of the host vehicle 301 to 0 and deactivate driving of the host vehicle 301 and/or autonomous driving control of the autonomous driving control device.

Figure 4:
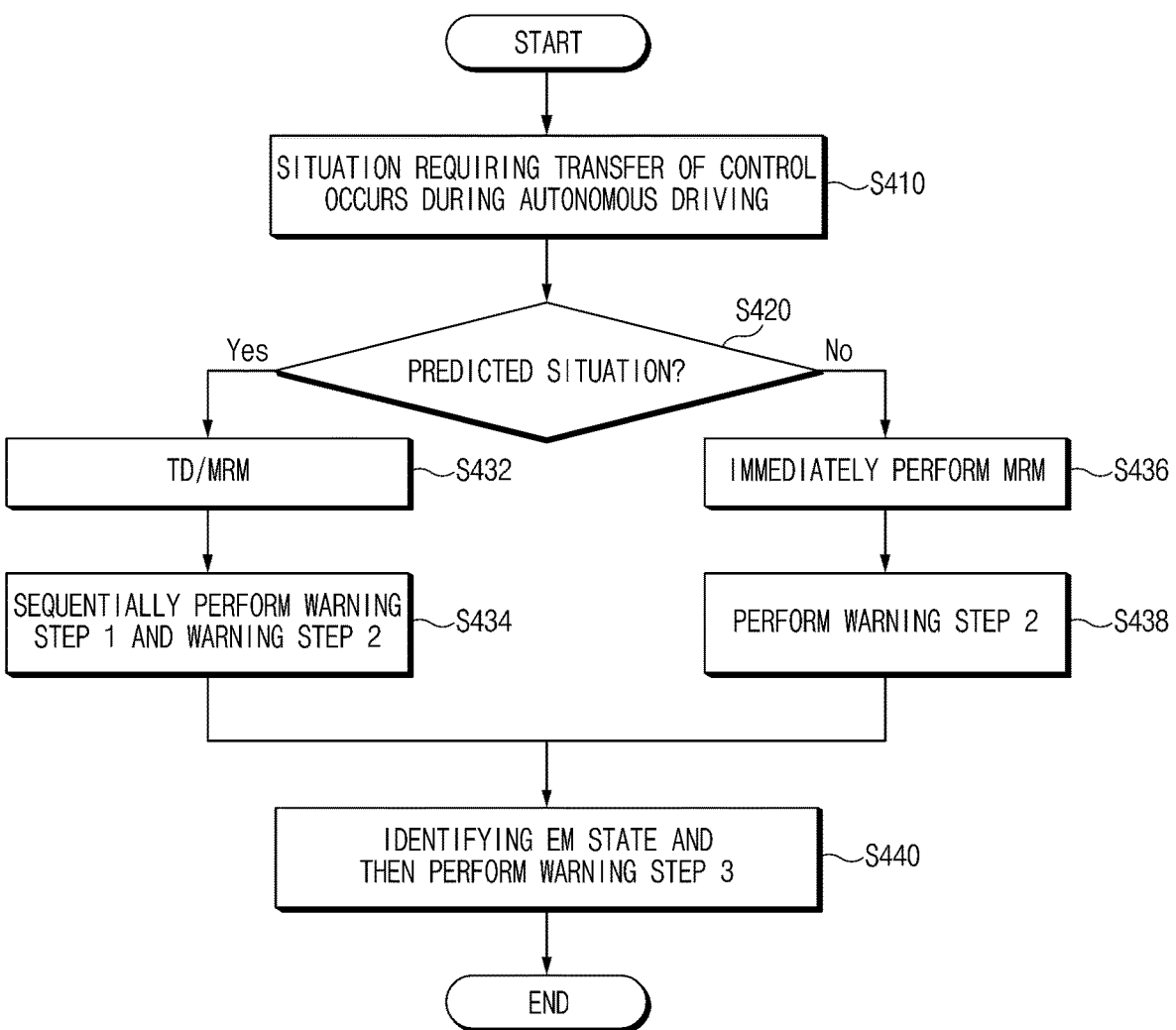
FIG. 4 is an operation flowchart of an autonomous driving control device.

FIG. 4 is an operation flowchart of an autonomous driving control device.

An autonomous driving control device (e.g., the autonomous driving control device in FIG. 1) may perform operations disclosed in FIG. 4. For example, at least some of components (e.g., the notification device 110, the controller 120, the memory 130, and/or the display device 140 in FIG. 1) included in the autonomous driving control device may be set to perform the operations in FIG. 4.

Operations of S410 to S440 may be sequentially performed, but are not necessarily sequentially performed. For example, an order of each operation may be changed, or at least two operations may be performed in parallel. In addition, contents with respect to FIG. 4 corresponding to or duplicated with the above contents may be briefly described or omitted.

The autonomous driving control device may identify whether a situation requiring a transfer of control has occurred during autonomous driving (S410).

For example, while controlling a host vehicle in an autonomous driving mode based on an autonomous driving step equal to or higher than a specified step (e.g., a level 3), the autonomous driving control device may identify that a situation in which control of the host vehicle must be transferred to a user has occurred.

The autonomous driving control device may identify whether the occurred situation is a predicted situation (S420).

For example, the predicted situation may include a predefined situation related to travel of the host vehicle stored in a memory. For example, the predicted situation may include at least one of a traffic volume of a road on which the host vehicle is traveling, a travel speed of the host vehicle, a travel state of a preceding vehicle of the host vehicle, or any combination thereof. For example, the predicted situation may include predefined reference parameters. In other words, an event may include various information on a travel situation of the host vehicle stored in advance.

For example, an unpredicted situation may include an emergency situation. For example, the emergency situation may include a situation different from the predicted situation. In other words, the emergency situation may include a travel situation that has not been stored in advance. For example, the emergency situation may include at least one of an operation error of the autonomous driving control device, an unpredictable situation (e.g., an occurrence of an accident, a line departure, an occurrence of an intruding vehicle, a change in an external environment, or any combination thereof) related to the travel of the host vehicle, or any combination thereof.

For example, when a situation requiring the transfer of the control is the predicted situation (e.g., step S420—Yes), the autonomous driving control device may perform steps S432 and S434. For example, when the situation requiring the transfer of the control is the predicted situation, it may be a situation corresponding to FIG. 2 described herein. In other words, steps S432 and S434 may be replaced with the operations of the autonomous driving control device in FIG. 2 described above.

For example, when the situation requiring the transfer of the control is not the predicted situation (e.g., step S420—No), the autonomous driving control device may perform steps S436 and S438. For example, when the situation requiring the transfer of the control is not the predicted situation, it may be a situation corresponding to FIG. 3 described herein. In other words, steps S436 and S438 may be replaced with the operations of the autonomous driving control device in FIG. 3 described above.

The autonomous driving control device may perform a transition demand (TD) and a minimum risk maneuver (MRM) (S432).

For example, the autonomous driving control device may perform the TD and control the host vehicle based on an MRM step 1 when the predicted situation related to the transfer of the control is identified.

The autonomous driving control device may sequentially perform a warning step 1 (or the first step notification 250 in FIG. 2) and a warning step 2 (or the second step notification 260 in FIG. 2) (S434).

For example, when not receiving a response regarding the transfer of the control from the user, the autonomous driving control device may sequentially transmit a first step notification and a second step notification.

For example, the first step notification may be transmitted on the premise that the autonomous driving control device identifies that the user is seated with the seat belt fastened. In other words, the autonomous driving control device may continuously identify whether the seat belt is fastened after a time point at which the situation requiring the transfer of the control has occurred, and normally transmit the first step notification when it is identified that the user is seated with the seat belt fastened.

For example, when it is identified that the user is seated with the seat belt not fastened or the user unfastens the seat belt at one of the time point (e.g., the first time point 205 in FIG. 2) at which the situation requiring the transfer of the control has occurred and a time point (e.g., the second time point 215 in FIG. 2) at which a TD execution time period is terminated, the autonomous driving control device may immediately control the host vehicle based on the MRM (e.g., the MRM step 1 in FIG. 2 or the MRM step 2 in FIG. 3). In other words, when it is identified that the user is seated with the seat belt not fastened, the autonomous driving control device may skip the transmission of the first step notification and immediately perform the MRM-based control of the host vehicle.

For example, while performing the MRM-based control of the host vehicle based on whether the seat belt is fastened, the autonomous driving control device may visually and/or audibly provide information on the seat belt to the user. The information on the seat belt may include at least one of a seat belt fastening guide, a seat belt fastened state, MRM activation information resulting from the unfastening of the seat belt, or any combination thereof.

For example, even when the user fastens the seat belt again after performing the MRM-based control of the host vehicle based on whether the seat belt is fastened, the autonomous driving control device may continue to perform the MRM-based control of the host vehicle. For example, when receiving the response regarding the transfer of the control from the user after performing the MRM-based control of the host vehicle based on whether the seat belt is fastened, the autonomous driving control device may transfer the control of the host vehicle to the user and terminate the control in the autonomous driving mode.

The autonomous driving control device may immediately perform the MRM (S436).

For example, when identifying the emergency situation, the autonomous driving control device may skip the performing of the TD and immediately control the host vehicle based on the MRM step 2.

The autonomous driving control device may perform the warning step 2 (S438).

For example, the autonomous driving control device may skip the transmission of the first step notification and immediately transmit the second step notification.

After identifying an emergency maneuver (EM) state, a warning step 3 may be performed (S440).

For example, when a situation (e.g., a situation immediately before a collision or a situation immediately before an accident) requiring EM control has occurred, the autonomous driving control device may transmit a third step notification with a greater intensity than the second step notification. For example, the third step notification may be a notification function of controlling components included in the notification device based on at least one of an intensity greater than that of the second step notification, a period smaller than that of the second step notification, or any combination thereof.

Figure 5:
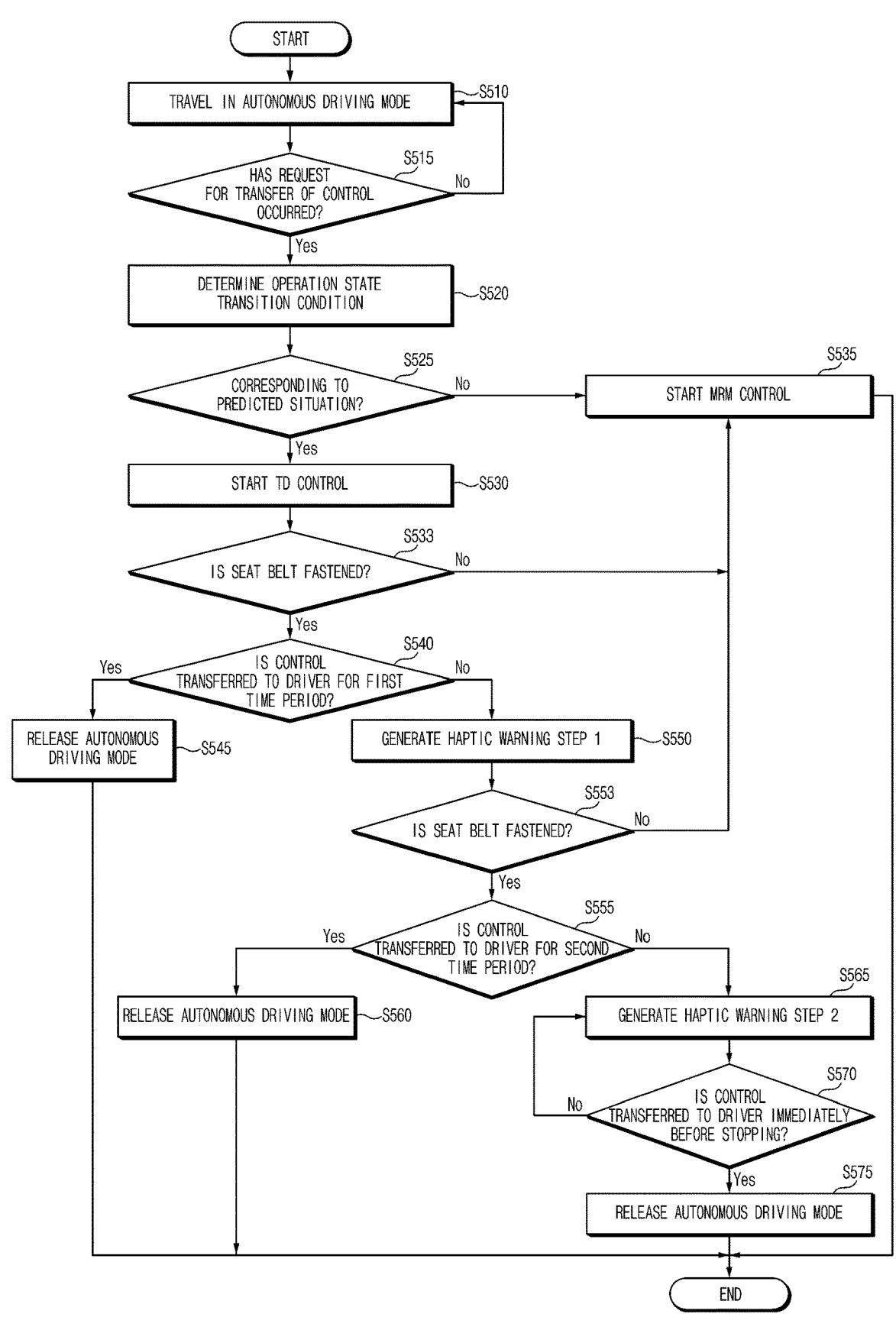
FIG. 5 is an operation flowchart of an autonomous driving control device.

FIG. 5 is an operation flowchart of an autonomous driving control device.

An autonomous driving control device (e.g., the autonomous driving control device in FIG. 1) may perform operations disclosed in FIG. 5. For example, at least some of components (e.g., the notification device 110, the controller 120, the memory 130, and/or the display device 140 in FIG. 1) included in the autonomous driving control device may be set to perform the operations in FIG. 5.

Operations of S510 to S575 may be sequentially performed, but are not necessarily sequentially performed. For example, an order of each operation may be changed, or at least two operations may be performed in parallel. In addition, contents with respect to FIG. 5 corresponding to or duplicated with the above contents may be briefly described or omitted. In addition, at least some of operations from S510 to S575 may be omitted. For example, operations based on S533 and/or S553 may be omitted.

The autonomous driving control device may control a host vehicle in an autonomous driving mode (S510).

For example, the autonomous driving control device may control the host vehicle in the autonomous driving mode based on an autonomous driving step equal to or higher than a specified step (e.g., a level 3).

The autonomous driving control device may identify whether a request for a transfer of control has occurred (S515).

For example, while controlling the host vehicle in the autonomous driving mode, the autonomous driving control device may identify that a situation in which the control of the host vehicle must be transferred to a user has occurred.

For example, when the situation requiring the transfer of the control has occurred (e.g., step S515—Yes), the autonomous driving control device may perform step S520.

For example, when the situation requiring the transfer of the control has not occurred (e.g., step S515—No), the autonomous driving control device may repeat step S510.

The autonomous driving control device may determine an operation state transition condition (S520).

For example, the operation state transition condition of the host vehicle may be determined. For example, the operation state transition condition may include a condition related to a travel state of the host vehicle.

The autonomous driving control device may determine whether the occurred situation requiring the transfer of the control corresponds to a predicted situation (S525).

For example, the predicted situation may include a predefined situation related to travel of the host vehicle stored in a memory. For example, the predicted situation may include at least one of a traffic volume of a road on which the host vehicle is traveling, a travel speed of the host vehicle, a travel state of a preceding vehicle of the host vehicle, or any combination thereof. For example, the predicted situation may include predefined reference parameters. In other words, an event may include various information on a travel situation of the host vehicle stored in advance.

For example, an unpredicted situation may include an emergency situation. For example, the emergency situation may include a situation different from the predicted situation. In other words, the emergency situation may include a travel situation that has not been stored in advance. For example, the emergency situation may include at least one of an operation error of the autonomous driving control device, an unpredictable situation (e.g., an occurrence of an accident, a line departure, an occurrence of an intruding vehicle, a change in an external environment, or any combination thereof) related to the travel of the host vehicle, or any combination thereof.

For example, when the situation requiring the transfer of the control is the predicted situation (e.g., step S525—Yes), the autonomous driving control device may perform step S530. For example, when the situation requiring the transfer of the control is the predicted situation, it may be a situation corresponding to FIG. 2 described herein. In other words, steps after step S530 may be replaced with the operations of the autonomous driving control device in FIG. 2 described above.

For example, when the situation requiring the transfer of the control is not the predicted situation (e.g., step S525—No), the autonomous driving control device may perform step S535. For example, when the situation requiring the transfer of the control is not the predicted situation, it may be a situation corresponding to FIG. 3 described herein. In other words, step S535 may be replaced with the operation of the autonomous driving control device in FIG. 3 described above.

If the situation requiring the transfer of control is not the predicted situation, the autonomous driving control device may start MRM control (S535). Operations of the autonomous driving control device after step S535 may be replaced with the description of FIGS. 3 and 4 above.

The autonomous driving control device may start transition demand (TD) control (S530).

For example, the autonomous driving control device may display information on the transfer of the control of the vehicle to the user, and may wait for reception of a response regarding the transfer of the control input from the user for a first time period.

For example, the autonomous driving control device may monitor whether a seat belt corresponding to the user is fastened. The autonomous driving control device may selectively perform one of a haptic warning and an MRM control based on a result of monitoring whether the seat belt is fastened.

The autonomous driving control device may identify whether the seat belt is fastened (S533).

For example, when identifying that the seat belt corresponding to the user is fastened (e.g., step S533—Yes), the autonomous driving control device may perform step S540.

For example, when identifying that the seat belt corresponding to the user is not fastened (e.g., step S533—No), the autonomous driving control device may perform step S535. For example, when the seat belt is not fastened or the user unfastens the seat belt during a TD control in the situation in which the seat belt is fastened, the autonomous driving control device may perform step S535.

Additionally and/or alternatively, while performing the MRM-based control of the host vehicle based on whether the seat belt is fastened, the autonomous driving control device may visually and/or audibly provide information on the seat belt to the user. The information on the seat belt may include at least one of a seat belt fastening guide, a seat belt fastened state, MRM activation information resulting from the unfastening of the seat belt, or any combination thereof.

For example, even when the user fastens the seat belt again after performing the MRM-based control of the host vehicle based on whether the seat belt is fastened, the autonomous driving control device may continue to perform the MRM-based control of the host vehicle. For example, when receiving the response regarding the transfer of the control from the user after performing the MRM-based control of the host vehicle based on whether the seat belt is fastened, the autonomous driving control device may transfer the control of the host vehicle to the user and terminate the control in the autonomous driving mode.

The autonomous driving control device may determine whether the control of the host vehicle is transferred to a driver (or the user) for the first time period (S540).

For example, the autonomous driving control device may determine whether the response regarding the transfer of the control is received from the user for the first time period.

For example, when receiving the response regarding the transfer of the control from the user for the first time period (e.g., step S540—Yes), the autonomous driving control device may perform step S545.

The autonomous driving control device may release the autonomous driving mode (S545).

For example, based on the reception of the response, the autonomous driving control device may transfer the control of the host vehicle to the user and release (or deactivate) the autonomous driving mode.

For example, when not receiving the response regarding the transfer of the control from the user for the first time period (e.g., step S540—No), the autonomous driving control device may perform step S550.

The autonomous driving control device may generate a haptic warning step 1 (S550).

For example, the haptic warning step 1 may include a first step notification using a notification device.

For example, a description of the first step notification may be replaced with the description of the first step notification in FIGS. 1 to 2 above.

For example, the autonomous driving control device may monitor whether the seat belt corresponding to the user is fastened. The autonomous driving control device may selectively perform one of the haptic warning and the MRM control based on the result of monitoring whether the seat belt is fastened.

The autonomous driving control device may identify whether the seat belt is fastened (S553).

For example, identifying that the seat belt corresponding to the user is fastened (e.g., step S553—Yes), the autonomous driving control device may perform step S555.

For example, when identifying that the seat belt corresponding to the user is not fastened (e.g., step S553—No), the autonomous driving control device may perform step S535. For example, when the seat belt is not fastened or the user unfastens the seat belt during the TD control in the situation in which the seat belt is fastened, the autonomous driving control device may perform step S535. Additionally and/or alternatively, while performing the MRM-based control of the host vehicle based on whether the seat belt is fastened, the autonomous driving control device may visually and/or audibly provide the information on the seat belt to the user. The information on the seat belt may include at least one of the seat belt fastening guide, the seat belt fastened state, the MRM activation information resulting from the unfastening of the seat belt, or any combination thereof. For example, even when the user fastens the seat belt again after performing the MRM-based control of the host vehicle based on whether the seat belt is fastened, the autonomous driving control device may continue to perform the MRM-based control of the host vehicle. For example, when receiving the response regarding the transfer of the control from the user after performing the MRM-based control of the host vehicle based on whether the seat belt is fastened, the autonomous driving control device may transfer the control of the host vehicle to the user and terminate the control in the autonomous driving mode.

The autonomous driving control device may determine whether the control of the host vehicle is transferred to the driver (or the user) for a second time period (S555).

For example, the autonomous driving control device may determine whether the response regarding the transfer of the control is received from the user for the second time period.

For example, when receiving the response regarding the transfer of the control from the user for the second time period (e.g., step S555—Yes), the autonomous driving control device may perform step S560.

The autonomous driving control device may release the autonomous driving mode (S560).

For example, based on the reception of the response, the autonomous driving control device may transfer the control of the host vehicle to the user and release (or deactivate) the autonomous driving mode.

For example, when not receiving the response regarding the transfer of the control from the user for the second time period (e.g., step S555—No), the autonomous driving control device may perform step S565.

The autonomous driving control device may generate a haptic warning step 2 (S565).

For example, the haptic warning step 2 may include a second step notification using the notification device.

For example, a description of the second step notification may be replaced with the description of the second step notification in FIGS. 1 to 3 above.

For example, the autonomous driving control device may continuously monitor whether the seat belt corresponding to the user is fastened even after performing the haptic warning step 2. The autonomous driving control device may perform the MRM control based on step S535 based on the result of monitoring whether the seat belt is fastened.

For example, after step S565, when identifying that the seat belt corresponding to the user is fastened, the autonomous driving control device may perform the MRM control based on step S535.

For example, when identifying that the seat belt corresponding to the user is not fastened, the autonomous driving control device may perform the MRM control based on step S535. For example, when the seat belt is not fastened or the user unfastens the seat belt during the TD control in the situation in which the seat belt is fastened, the autonomous driving control device may perform the MRM control based on step S535.

Additionally and/or alternatively, while performing the MRM-based control of the host vehicle based on whether the seat belt is fastened, the autonomous driving control device may visually and/or audibly provide the information on the seat belt to the user. The information on the seat belt may include at least one of the seat belt fastening guide, the seat belt fastened state, the MRM activation information resulting from the unfastening of the seat belt, or any combination thereof.

For example, even when the user fastens the seat belt again after performing the MRM-based control of the host vehicle based on whether the seat belt is fastened, the autonomous driving control device may continue to perform the MRM-based control of the host vehicle. For example, when receiving the response regarding the transfer of the control from the user after performing the MRM-based control of the host vehicle based on whether the seat belt is fastened, the autonomous driving control device may transfer the control of the host vehicle to the user and terminate the control in the autonomous driving mode.

The autonomous driving control device may determine whether the control of the host vehicle is transferred to the driver (or the user) immediately before stopping (S570).

For example, the autonomous driving control device may determine whether the response regarding the transfer of the control is received from the user while performing the haptic warning step 2. For example, the autonomous driving control device may transfer the control to the user based on the reception of the response regarding the control.

For example, when the control is transferred to the user while performing the haptic warning step 2 (e.g., step S570—Yes), the autonomous driving control device may perform step S575.

The autonomous driving control device may release the autonomous driving mode (S575).

For example, based on the reception of the response, the autonomous driving control device may transfer the control of the host vehicle to the user and release (or deactivate) the autonomous driving mode.

For example, when the control is not transferred to the user while performing the haptic warning step 2 (e.g., step S570—No), the autonomous driving control device may repeat step S565.

Figure 6:
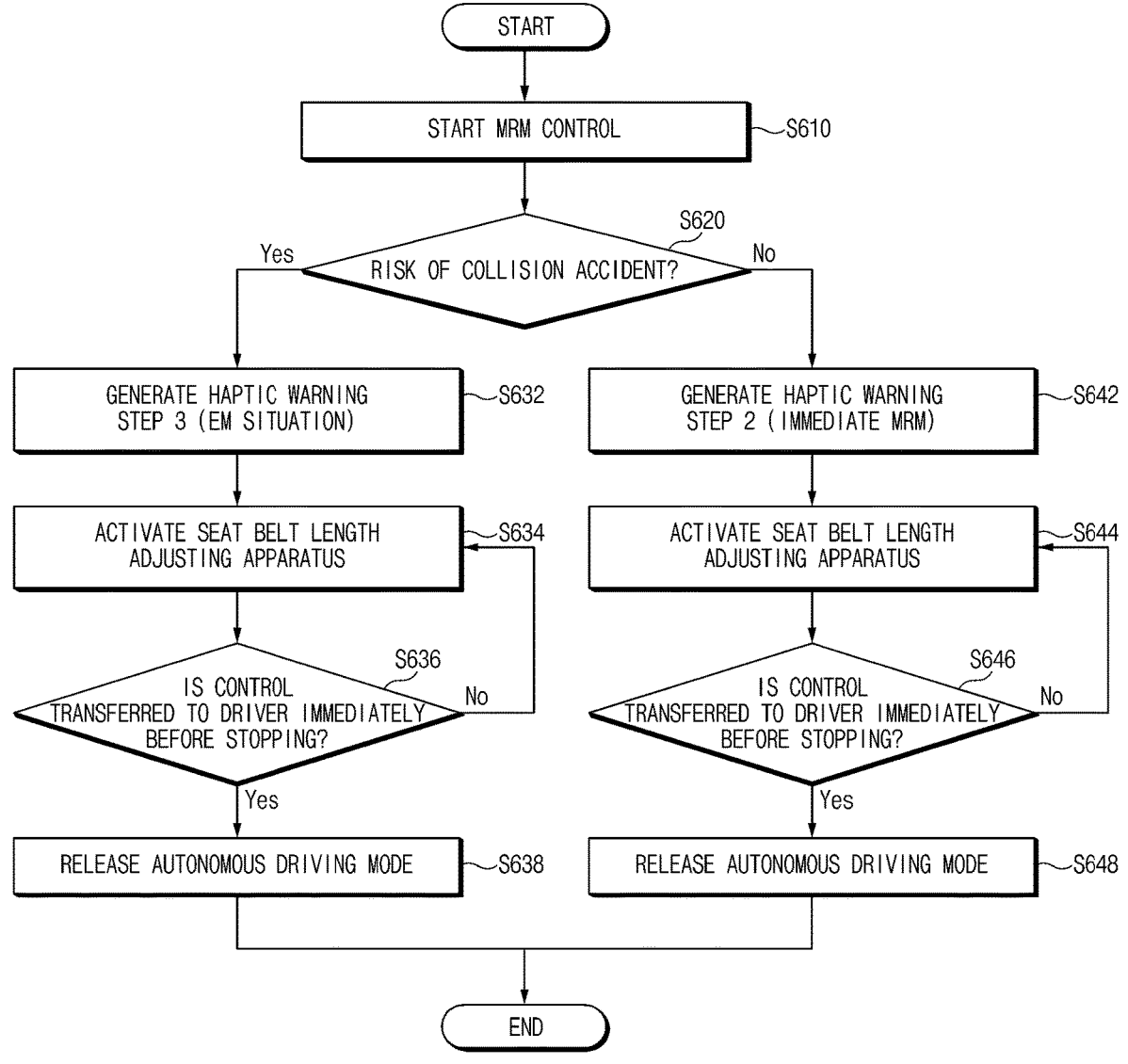
FIG. 6 is an operation flowchart of an autonomous driving control device.

FIG. 6 is an operation flowchart of an autonomous driving control device.

An autonomous control device (e.g., the autonomous driving control device in FIG. 1) may perform operations disclosed in FIG. 6. For example, at least some of components (e.g., the notification device 110, the controller 120, the memory 130, and/or the display device 140 in FIG. 1) included in the autonomous driving control device may be set to perform the operations in FIG. 6.

Operations of S610 to S648 may be sequentially performed, but are not necessarily sequentially performed. For example, an order of each operation may be changed, or at least two operations may be performed in parallel. In addition, contents with respect to FIG. 6 corresponding to or duplicated with the above contents may be briefly described or omitted.

The operation of the autonomous driving control device based on FIG. 6 may be referred to as an operation after identifying that an emergency situation has occurred while the autonomous driving control device performs autonomous driving control of a host vehicle based on an autonomous driving mode of a step equal to or higher than a specified step.

The autonomous driving control device may start an MRM control (S610).

For example, the MRM control may be replaced with the description of the operation of the autonomous driving control device in FIG. 3 above. In other words, the MRM control in step S610 may be a control operation performed by the autonomous driving control device skipping TD execution.

The autonomous driving control device may determine whether there is a risk of a collision accident of the host vehicle (S620).

For example, when there is the risk of the collision accident of the host vehicle (e.g., step S620—Yes), the autonomous driving control device may perform steps S632 to S638.

The autonomous driving control device may generate a haptic warning step 3 (S632).

For example, the autonomous driving control device may transmit a third step notification using a notification device.

For example, the third step notification may include a notification function with the greatest intensity and/or the smallest period using the notification device. In other words, the third step notification may include the most powerful notification function using the notification device. The situation in which the third step notification has occurred may be defined as EM situation.

The autonomous driving control device may activate a seat belt length adjusting apparatus (S634).

For example, the autonomous driving control device may activate the seat belt length adjusting apparatus based on a period corresponding to the haptic warning step 3.

For example, the autonomous driving control device may additionally and/or alternatively activate a seat angle adjusting apparatus. For example, the autonomous driving control device may activate the seat angle adjusting apparatus based on an angle range corresponding to the haptic warning step 3.

The autonomous driving control device may determine whether control is transferred to a driver immediately before stopping (S636).

For example, when the control of the host vehicle is transferred to the driver immediately before the host vehicle stops (e.g., step S636—Yes), the autonomous driving control device may perform step S638.

For example, when the control of the host vehicle is not transferred to the driver immediately before the host vehicle stops (e.g., step S636—No), the autonomous driving control device may repeat step S634.

The autonomous driving control device may release the autonomous driving mode (S638).

For example, based on reception of a response regarding the transfer of the control from the user, the autonomous driving control device may transfer the control of the host vehicle to the user and release (or deactivate) the autonomous driving mode.

For example, when there is no risk of the collision accident of the host vehicle (e.g., step S620—No), the autonomous driving control device may perform steps S642 to S648.

The autonomous driving control device may generate a haptic warning step 2 (S642).

For example, the autonomous driving control device may transmit a second step notification using the notification device. For example, the situation in which the second step notification has occurred may be immediately defined as an MRM situation. In other words, the situation in which the second step notification has occurred in step S642 may be defined as an immediate MRM situation in which TD execution control is skipped and the MRM control is immediately performed.

The autonomous driving control device may activate the seat belt length adjusting apparatus (S644).

For example, the autonomous driving control device may activate the seat belt length adjusting apparatus based on a period corresponding to the haptic warning step 2. For example, an operation period of the seat belt length adjusting apparatus corresponding to the haptic warning step 2 may be greater than the period corresponding to the haptic warning step 3 described above.

For example, the autonomous driving control device may additionally and/or alternatively activate the seat angle adjusting apparatus. For example, the autonomous driving control device may activate the seat angle adjusting apparatus based on an angle range corresponding to the haptic warning step 2. For example, the angle range of the seat angle adjusting apparatus corresponding to the haptic warning step 2 may be smaller than the angle range corresponding to the haptic warning step 3 described above.

The autonomous driving control device may determine whether the control is transferred to the driver immediately before stopping (S646).

For example, when the control of the host vehicle is transferred to the driver immediately before the host vehicle stops (e.g., step S636—Yes), the autonomous driving control device may perform step S648.

For example, when the control of the host vehicle is not transferred to the driver immediately before the host vehicle stops (e.g., step S646—No), the autonomous driving control device may repeat step S644.

The autonomous driving control device may release the autonomous driving mode (S648).

For example, based on the reception of the response regarding the transfer of the control from the user, the autonomous driving control device may transfer the control of the host vehicle to the user and release (or deactivate) the autonomous driving mode.

The autonomous driving control device may identify a manual seat angle adjustment input received from the user in step S634 and/or step S644.

For example, while performing step S634 and/or step S644 using the seat angle adjusting apparatus, the autonomous driving control device may receive the manual seat angle adjustment input that lasts for a specific time from the user.

As an example, when the specific time period for which the manual seat angle adjustment input lasts exceeds a predefined time period, the autonomous driving control device may identify the corresponding manual seat angle adjustment input as a response will of the user regarding the transfer of the control and terminate (or release) autonomous driving control of the host vehicle 201.

For example, when the specific time period for which the manual seat angle adjustment input lasts is equal to or smaller than the predefined time period, the autonomous driving control device may continuously provide a notification or perform the autonomous driving control.

Figure 7:
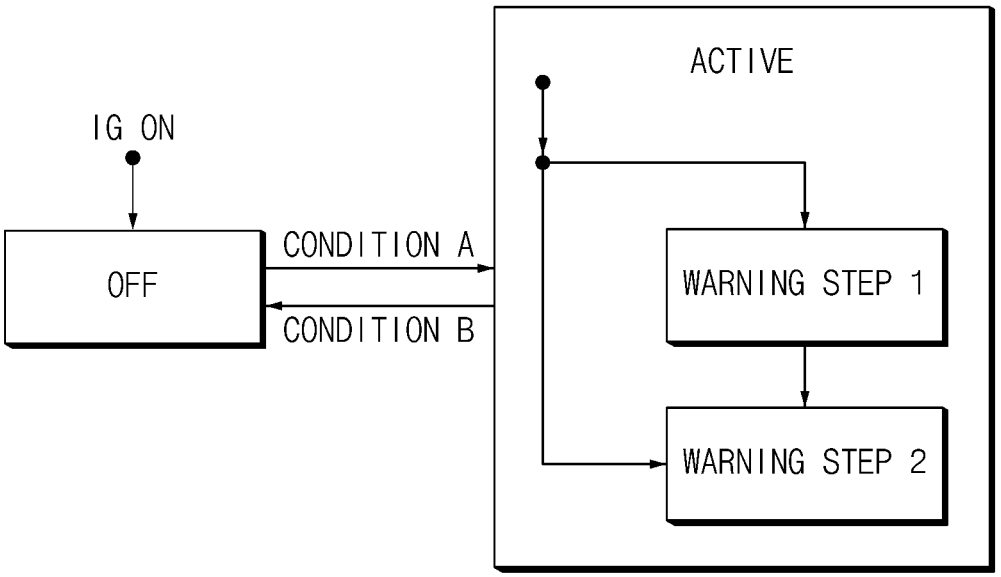
FIG. 7 is a conceptual diagram of an operation of a notification device.

FIG. 7 is a conceptual diagram of an operation of a notification device.

Referring to FIG. 7, a state of a notification device (e.g., the notification device 110 in FIG. 1) may be transitioned to an active (ACTIVE) state or an inactive (OFF) state based on a specified operation algorithm.

If the host vehicle has been started (e.g., IG ON), an initial state of the notification device may be an OFF state. In other words, when the host vehicle is first started, the initial operation state of the notification device may be set to the OFF state.

After the host vehicle is started, when a condition related to activation of the notification device is satisfied, the operation state of the notification device may be changed to the active state.

For example, when a condition 'a' including at least one condition for the activation of the notification device is satisfied, the operation state of the notification device may be transitioned from the inactive state to the active state. For example, the condition 'a' may include a case in which a control signal for transmitting a first step notification or a control signal for transmitting a second step notification is received from a controller.

when a condition 'b' including at least one condition for deactivation of the notification device is satisfied in the state in which the notification device is activated, the operation state of the notification device may be transitioned from the active state to the inactive state. For example, the condition 'b' may include a case in which the control signal for transmitting the first step notification or the control signal for transmitting the second step notification is no longer received from the controller.

Figure 8A:
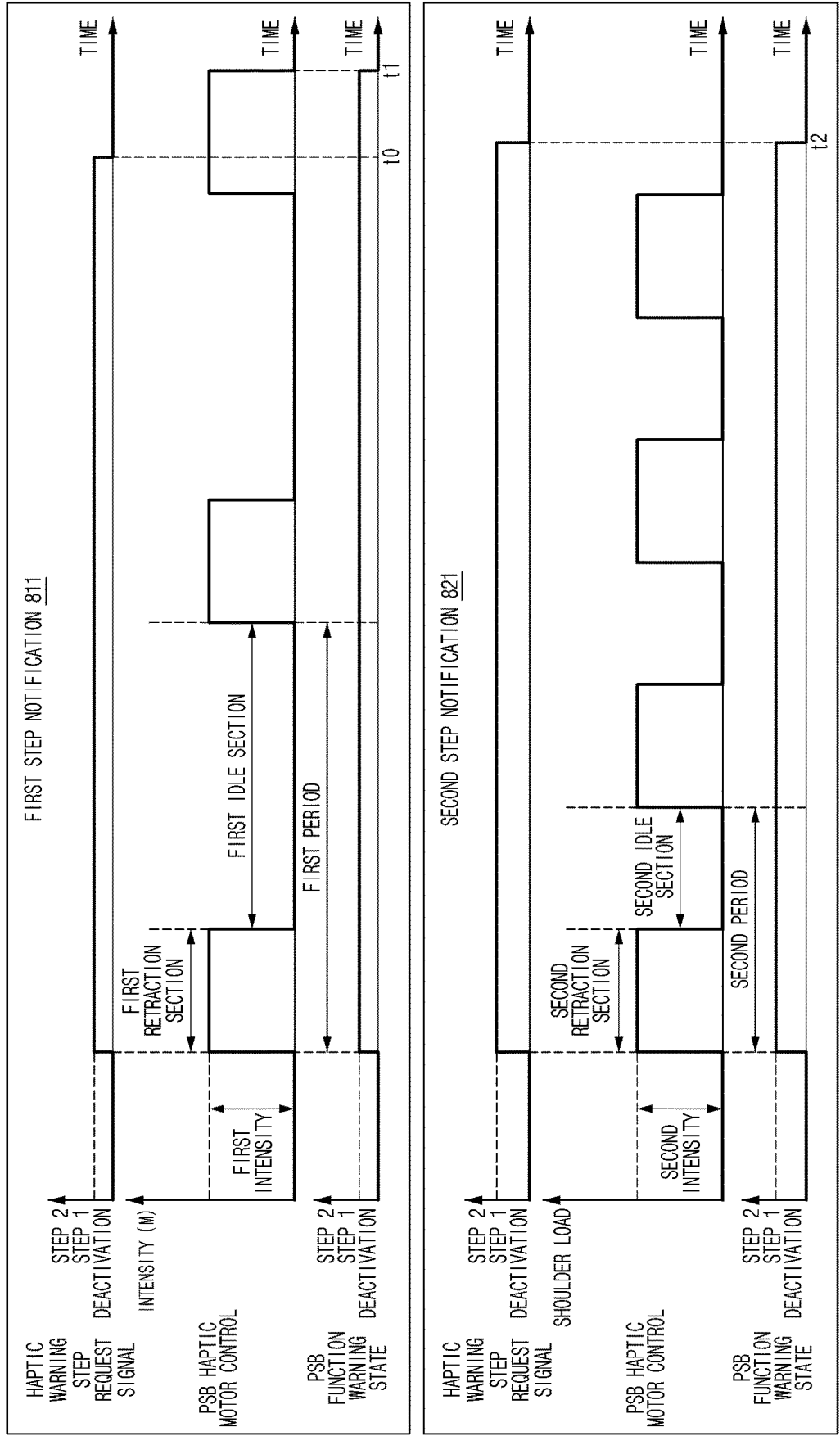
FIG. 8A is a conceptual diagram of an operation for each step of a notification device.

FIG. 8A is a conceptual diagram of an operation for each step of a notification device according to an embodiment of the present disclosure.

Referring to FIG. 8A, according to one embodiment, an autonomous driving control device (e.g., the autonomous driving control device 100 in FIG. 1) may control a notification device (e.g., the notification device 110 in FIG. 1) based on an illustrated graph. An operation of the notification device according to FIG. 8A may be defined as an operation of a seat belt length adjusting apparatus included in the notification device.

According to one embodiment, when a specified condition (e.g., a case in which a response regarding a transfer of control is not received from a user for a first time period) is satisfied, the autonomous driving control device may control the notification device to transmit a first step notification 811.

For example, the autonomous driving control device may transmit a haptic warning step request signal (or a first notification step request signal) to the notification device. In this case, a pre-active seat belt (PSB) haptic motor (or the seat belt length adjusting apparatus) may retract (or wind) a seat belt with a first intensity for a first retraction section based on reception of the request signal, and stop operating for a first idle section to allow the seat belt to be relaxed (or loosened). For example, a total section including the first retraction section and the first idle section may be defined as a first period.

For example, even when the reception of the request signal is stopped at a first time point to, a retraction section that has occurred immediately before the first time point to may be maintained for the same period as the first retraction section and stopped at a second time point t1.

According to one embodiment, when a specified condition (e.g., a case in which the response regarding the transfer of the control is not received from the user for a second time period) is satisfied, the autonomous driving control device may control the notification device to transmit a second step notification 821.

For example, the autonomous driving control device may transmit the haptic warning step request signal (or a second notification step request signal) to the notification device. In this case, the PSB haptic motor (or the seat belt length adjusting apparatus) may retract (or wind) the seat belt with a second intensity for a second retraction section based on reception of the request signal, and stop operating for a second idle section to allow the seat belt to be relaxed (or loosened). For example, a total section including the second retraction section and the second idle section may be defined as a second period.

For example, the second intensity may be greater than the first intensity, and the second idle section may be smaller than the first idle section. For example, the second period may be smaller than the first period.

For example, when the reception of the request signal is stopped at a third time point t2, driving of the notification device may be terminated.

Figure 8B:
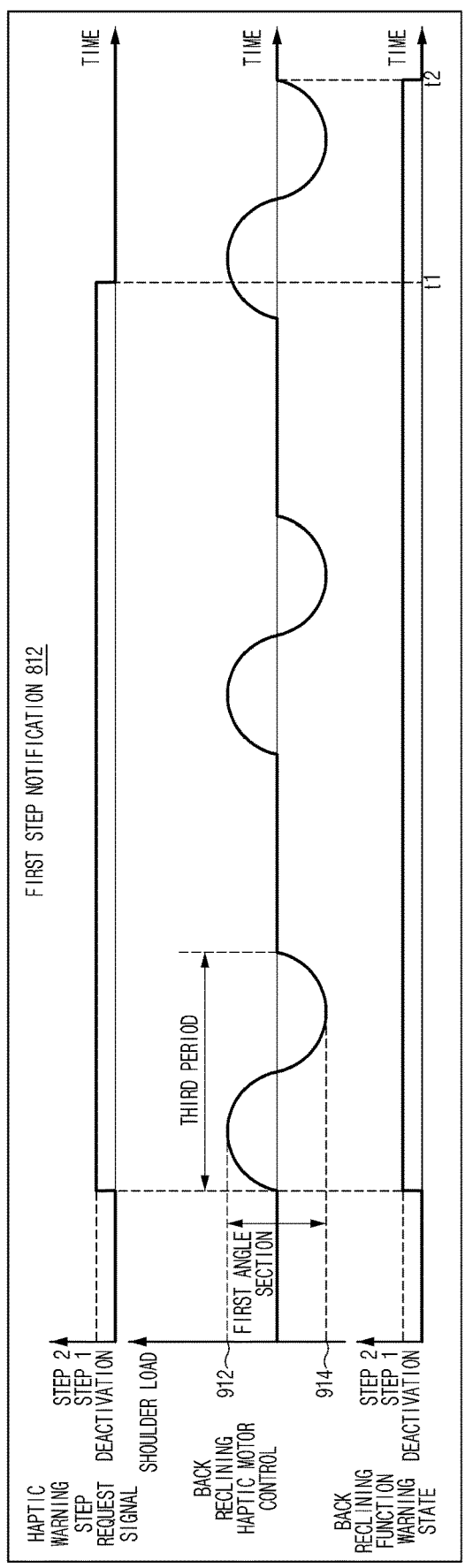
FIG. 8B is a conceptual diagram of an operation for each step of a notification device.
Figure 8B:
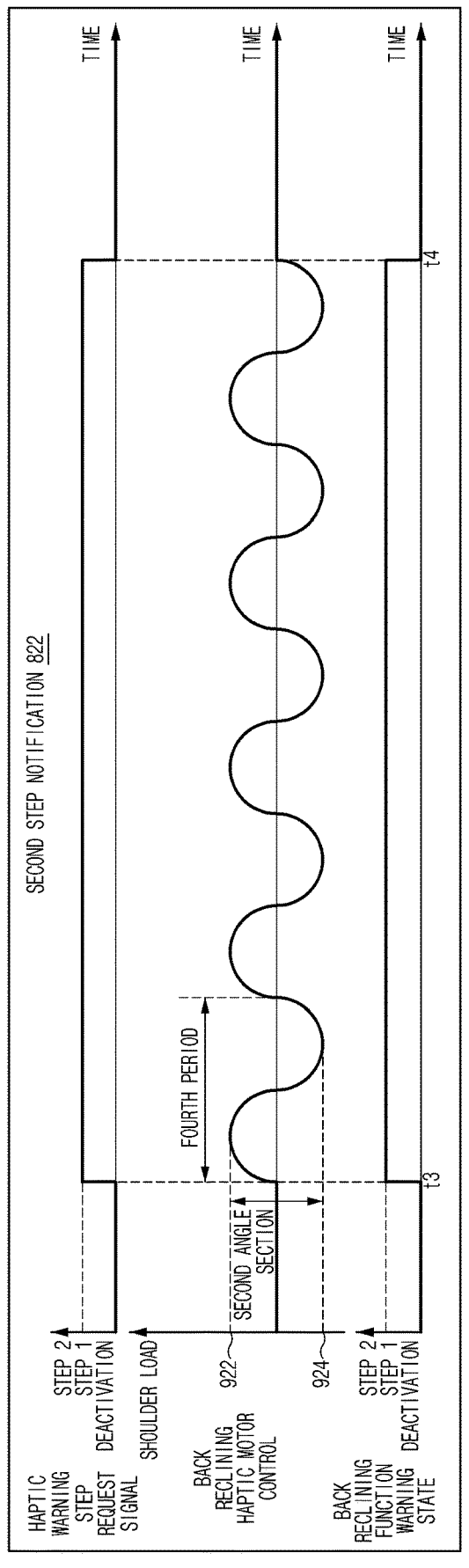

FIG. 8B is a conceptual diagram of an operation for each step of a notification device according to an embodiment of the present disclosure.

Referring to FIG. 8B, according to one embodiment, an autonomous driving control device (e.g., the autonomous driving control device 100 in FIG. 1) may control a notification device (e.g., the notification device 110 in FIG. 1) based on an illustrated graph. An operation of the notification device according to FIG. 8B may be defined as an operation of a seat angle adjusting apparatus included in the notification device.

According to one embodiment, when a specified condition (e.g., a case in which a response regarding a transfer of control is not received from a user for a first time period) is satisfied, the autonomous driving control device may control the notification device to transmit a first step notification 812.

For example, the autonomous driving control device may transmit a haptic warning step request signal (or a first notification step request signal) to the notification device. In this case, a seat back reclining haptic motor (or the seat angle adjusting apparatus) may adjust an angle of a seat based on a third period within a first angle section based on the reception of the request signal. In other words, the seat angle adjusting apparatus may be configured to gradually and repeatedly change the angle of the seat from a minimum value to a maximum value of the first angle section based on the third period.

For example, even when the reception of the request signal is stopped at the first time point t1, an operation of the seat angle adjusting apparatus that has occurred immediately before the first time point t1 may be maintained for the same period as the third period and stopped at a second time point t2.

According to one embodiment, when a specified condition (e.g., a case in which the response regarding the transfer of the control is not received from the user for a second time period) is satisfied, the autonomous driving control device may control the notification device to transmit a second step notification 822.

For example, the autonomous driving control device may transmit the haptic warning step request signal (or a second notification step request signal) to the notification device. In this case, the seat back reclining haptic motor (or the seat angle adjusting apparatus) may adjust the angle of the seat based on a fourth period within a second angle section based on the reception of the request signal. In other words, the seat angle adjusting apparatus may be configured to gradually and repeatedly change the angle of the seat from a minimum value to a maximum value of the second angle section based on the fourth period.

For example, the second angle section may be greater than the first angle section, and the fourth period may be smaller than the third period.

For example, when the request signal received at a third time point t3 is stopped at a fourth time point t4, driving of the notification device may be terminated.

Figure 9:
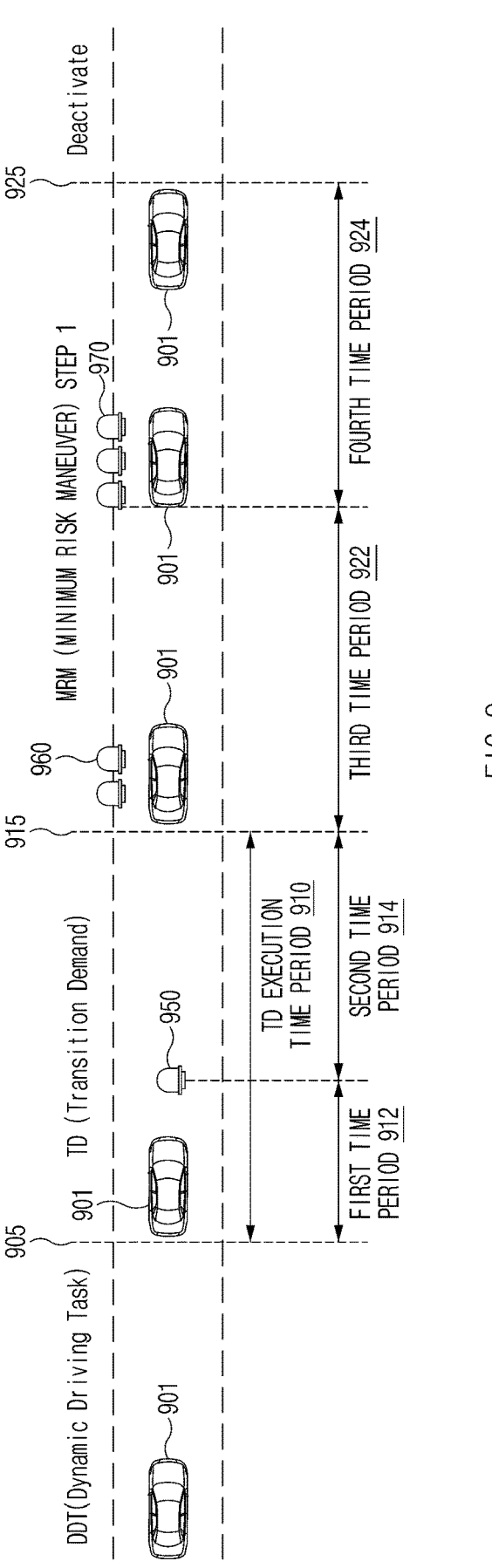
FIG. 9 is a conceptual diagram of an operation of an autonomous driving control device.

FIG. 9 is a conceptual diagram of an operation of an autonomous driving control device according to an embodiment of the present disclosure.

According to one embodiment, a description of some of components and operations shown in FIG. 9 the same as those described above in FIG. 2 may refer to and/or be replaced with the description in FIG. 2 above. In other words, an operation of an autonomous driving device according to FIG. 9 may include an operation performed additionally and/or alternatively in the operations of the autonomous driving device in FIG. 2.

According to one embodiment, an autonomous driving control device (e.g., the autonomous driving control device 100 in FIG. 1) may control a host vehicle 901 in an autonomous driving mode. For example, the autonomous driving control device may control the host vehicle 901 in the autonomous driving mode based on an autonomous driving step equal to or higher than a specified step (e.g., a level 3).

According to one embodiment, the autonomous driving control device may identify that an event related to a transfer of control of the host vehicle 901 has occurred at a first time point 905 while controlling the host vehicle 901 in the autonomous driving mode based on the autonomous driving mode (e.g., a dynamic driving task (DDT)).

According to one embodiment, the autonomous driving control device may display information on the transfer of the control to a user based on the identification of the occurrence of the event at the first time point 905. For example, the autonomous driving control device may provide the user with various information indicating that control of the user is required using a display device (e.g., the display device 140 in FIG. 1).

According to one embodiment, when not receiving a response regarding the transfer of the control from the user for a first time period 912, the autonomous driving control device may transmit a first step notification 950 using a notification device (e.g., the notification device 110 in FIG. 1). For example, when receiving the response regarding the transfer of the control from the user for the first time period 912, the autonomous driving control device may transfer the control of the host vehicle 901 to the user and terminate the control in the autonomous driving mode.

For example, the first step notification 950 may include a notification function using a seat belt length adjusting apparatus and/or a seat angle adjusting apparatus included in the notification device.

For example, the first step notification 950 may include an operation of controlling a length of a seat belt with a first intensity based on a first period using the seat belt length adjusting apparatus. The first period may include, for example, a first retraction section of winding the seat belt with the first intensity and a first idle section. The first retraction section and/or the first idle section may be set values changeable by the user and/or a producer.

For example, the first step notification 950 may include an operation of controlling an angle of a seat within a first angle section based on a third period using the seat angle adjusting apparatus. The first step notification 950 using the seat angle adjusting apparatus may include, for example, an operation of gradually and repeatedly changing the angle of the seat from a minimum value to a maximum value of the first angle section. The third period may be a set value changeable by the user and/or the producer.

According to one embodiment, when not receiving the response regarding the transfer of the control from the user for a second time period 914 from a time point at which the first step notification 950 is transmitted, the autonomous driving control device may transmit a second step notification 960 using the notification device. For example, when receiving the response regarding the transfer of the control from the user for the second time period 914, the autonomous driving control device may transfer the control of the host vehicle 901 to the user and terminate the control in the autonomous driving mode.

For example, the second step notification 960 may include a notification function of selectively using one of the seat belt length adjusting apparatus and the seat angle adjusting apparatus included in the notification device.

For example, the second step notification 960 may include an operation of controlling the length of the seat belt with a second intensity greater than the first intensity based on a second period smaller than the first period using the seat belt length adjusting apparatus. The second period may include, for example, a second retraction section of winding the seat belt with the second intensity and a second idle section. The second retraction section and the second idle section may be set values changeable by the user and/or the producer.

For example, the second step notification 960 may include an operation of controlling the angle of the seat in a second angle section greater than the first angle section based on a fourth period smaller than the third period using the seat angle adjusting apparatus. The second step notification 960 using the seat angle adjusting apparatus may include an operation of gradually and repeatedly changing the angle of the seat from a minimum value to a maximum value of the second angle section. The fourth period may be a set value changeable by the user and/or the producer.

According to one embodiment, a time period from the first time point 905, which is the time point at which the event related to the transfer of the control has occurred, to a second time point 915, which is a time point at which the second step notification 960 is transmitted, may be defined as a transition demand (TD) execution time period 910. For example, the TD execution time period 910 may be defined as a limit time period for informing the user that the transfer of the control is necessary. After the limit time period passes, the autonomous driving control device may reduce a travel speed of the host vehicle 901.

According to one embodiment, while transmitting the second step notification 960, the autonomous driving control device may control the host vehicle 901 based on a first MRM (or an MRM step 1) including an operation of reducing the travel speed of the host vehicle 901 at a first acceleration for a third time period 922.

According to one embodiment, when not receiving the response regarding the transfer of the control from the user for the third time period 922, the autonomous driving control device may transmit a third step notification 970. For example, the third step notification 970 may include a notification function of providing a notification function to the user using both the seat belt length adjusting apparatus and the seat angle adjusting apparatus included in the notification device.

For example, the third step notification 970 may include a notification function in which an operation period of the seat belt length adjusting apparatus is set to a period smaller than the second period and an operation intensity thereof is set to an intensity greater than the second intensity. For example, the third step notification 970 may include a notification function in which an angle section of the seat angle adjusting apparatus is set to an angle section greater than the second angle section and an operation period thereof is set to a period smaller than the fourth period.

For example, the third step notification 970 may include a control function of reducing the travel speed of the host vehicle at an acceleration having an absolute value greater than an absolute value of the second acceleration.

According to one embodiment, when not receiving the response regarding the transfer of the control from the user for a fourth time period 924 from a time point at which the third step notification 970 is transmitted, the autonomous driving control device may reduce the travel speed of the host vehicle 901 until a third time point 925 at which the travel speed of the host vehicle 901 is equal to or lower than a specified value (e.g., 0 m/s). In addition, the autonomous driving control device may provide the user with at least one of a travel situation of the host vehicle 901, control transfer required information, or any combination thereof using the display device via visual and/or auditory content.

According to one embodiment, when not receiving the response regarding the transfer of the control until the third time point 925, the autonomous driving control device may terminate the travel of the host vehicle 901. For example, the autonomous driving control device may reduce the travel speed of the host vehicle 901 to 0 and release (or deactivate) driving of the host vehicle 901 and/or the autonomous driving control of the autonomous driving control device.

According to one embodiment, the above-described operations performed by the autonomous driving control device as the third step notification 970 are exemplary, and the embodiments of the present disclosure are not limited thereto.

For example, the autonomous driving control device may transmit the third step notification 970 using at least some of other components (e.g., a haptic function providing device including at least one of cushion vibration, headrest vibration, sound notification, or any combination thereof) including the above-described embodiments.

For example, the autonomous driving control device may transmit the third step notification 970 in a scheme of changing a period of the aforementioned notification function. For example, the autonomous driving control device may reduce a period of the third step notification 970 as time elapses.

Figure 10:
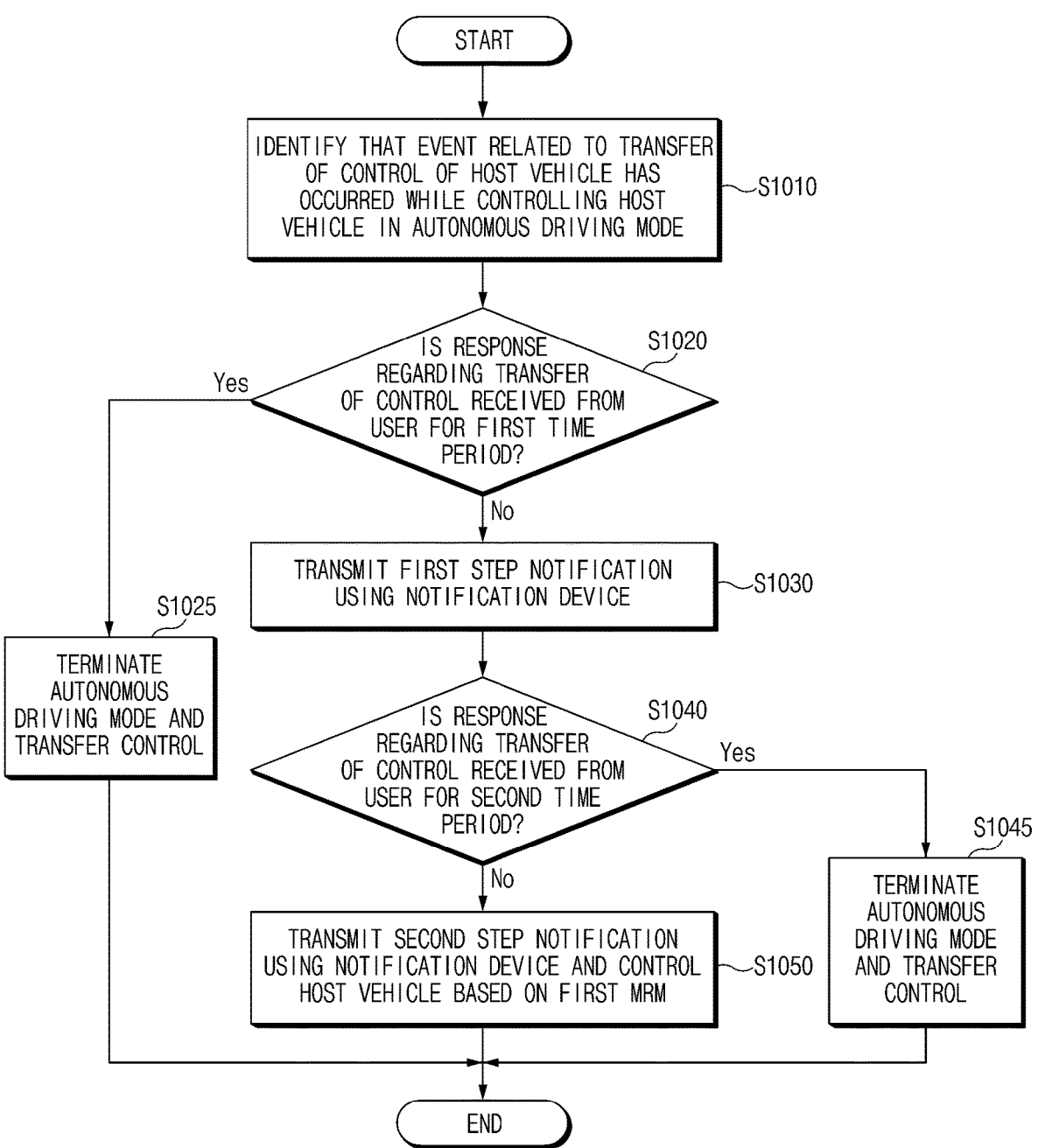
FIG. 10 is an operation flowchart of an autonomous driving control device.

FIG. 10 is an operation flowchart of an autonomous driving control device according to an embodiment of the present disclosure.

According to one embodiment, an autonomous driving control device (e.g., the autonomous driving control device in FIG. 1) may perform operations disclosed in FIG. 10. For example, at least some of components (e.g., the notification device 110, the controller 120, the memory 130, and/or the display device 140 in FIG. 1) included in the autonomous driving control device may be set to perform the operations in FIG. 10.

In a following embodiment, operations of S1010 to S1050 may be sequentially performed, but are not necessarily sequentially performed. For example, an order of each operation may be changed, or at least two operations may be performed in parallel. In addition, contents corresponding to or duplicated with the above description with respect to FIG. 10 may be briefly described or omitted.

According to one embodiment, the autonomous driving control device may identify that an event related to a transfer of control of host vehicle has occurred while controlling the host vehicle in an autonomous driving mode (S1010).

For example, the event related to the transfer of the control of the host vehicle may include information on a travel situation of the host vehicle. For example, the event may include at least one of a traffic volume of a road on which the host vehicle is traveling, a travel speed of the host vehicle, a travel state of a preceding vehicle of the host vehicle, or any combination thereof. For example, the event may include threshold reference parameters. In other words, the event may include various information on the travel situation of the host vehicle stored in advance.

For another example, the autonomous driving control device may identify an emergency situation. Description of an operation of the autonomous driving control device when identifying the emergency situation may be replaced with the description in FIG. 3 above.

According to one embodiment, the autonomous driving control device may monitor whether a response regarding the transfer of the control response is received from a user for a first time period (S1020).

For example, the response regarding the transfer of the control may include at least one of control of a steering wheel of the host vehicle, a pressure on an accelerator pedal and/or a brake pedal of the host vehicle, a touch input to a display of the host vehicle, or any combination thereof.

For example, when receiving the response regarding the transfer of the control for the first time period (e.g., step S1020—Yes), the autonomous driving control device may perform step S1025.

For example, when not receiving the response regarding the transfer of the control for the first time period (e.g., step S1020—No), the autonomous driving control device may perform step S1030.

According to one embodiment, the autonomous driving control device may terminate the operation of the autonomous driving mode and transfer the control to the user based on the reception of the response regarding the transfer of the control (S1025).

For example, the autonomous driving control device may provide information on the transfer of the control to the user in real time (e.g., substantially at the same time or within a relatively short threshold time period) via a display device.

According to one embodiment, the autonomous driving control device may transmit a first step notification using a notification device (S1030).

For example, the first step notification may include an operation of controlling a length of a seat belt with a first intensity based on a first period using a seat belt length adjusting apparatus. The first period may include, for example, a first retraction section of winding the seat belt with the first intensity and a first idle section. The first retraction section and/or the first idle section may be set values changeable by the user and/or a producer.

For example, the first step notification may include an operation of controlling an angle of a seat within a first angle section based on a third period using a seat angle adjusting apparatus. The first step notification using the seat angle adjusting apparatus may include, for example, an operation of gradually and repeatedly changing the angle of the seat from a minimum value to a maximum value of the first angle section. The third period may be a set value changeable by the user and/or the producer.

According to one embodiment, the autonomous driving control device may monitor whether the response regarding the transfer of the control is received from the user for a second time period (S1040).

For example, when receiving the response regarding the transfer of the control for the second time period (e.g., step S1040—Yes), the autonomous driving control device may perform step S1045.

For example, when not receiving the response regarding the transfer of the control for the first time period (e.g., step S1040—No), the autonomous driving control device may perform step S1050.

According to one embodiment, the autonomous driving control device may terminate the operation of the autonomous driving mode and transfer the control to the user based on the reception regarding the transfer of the control (S1045).

For example, the autonomous driving control device may provide information on the transfer control to the user in real time (e.g., substantially at the same time or within a relatively short threshold time period) via the display device.

According to one embodiment, the autonomous driving control device may transmit a second step notification using the notification device and control the host vehicle based on a first MRM (S1050).

For example, the second step notification may include an operation of controlling the length of the seat belt with a second intensity greater than the first intensity based on a second period smaller than the first period using the seat belt length adjusting apparatus. The second period may include, for example, a second retraction section of winding the seat belt with the second intensity and a second idle section. The second retraction section and the second idle section may be set values changeable by the user and/or the producer.

For example, the second step notification may include an operation of controlling the angle of the seat within a second angle section greater than the first angle section based on a fourth period less than the third period using the seat angle adjusting apparatus. The second step notification using the seat angle adjusting apparatus may include an operation of gradually and repeatedly changing the angle of the seat from a minimum value to a maximum value of the second angle section. The fourth period may be a set value changeable by the user and/or the producer.

For example, the notification device may perform a notification function in response to various types of control signals. For example, the notification device may perform some of a plurality of steps of the notification function in response to the control signal including at least one of a ramp-up signal, a step signal, a sinusoidal signal, or any combination thereof.

For example, the autonomous driving control device may control the travel speed of the host vehicle while transmitting the second step notification. For example, the autonomous driving control device may control the host vehicle based on a first MRM (minimum risk maneuver) that reduces the travel speed of the host vehicle at a first acceleration (e.g., $-1$ m/s$^2$) while transmitting the second step notification.

For example, the autonomous driving control device may provide the user with various information on travel control of the host vehicle using the display device. For example, the autonomous driving control device may provide information on at least one of the event related to the transfer of the control, the first step notification, the second step notification, information on whether the autonomous driving mode is released, or any combination thereof to the user using the display device via visual and/or auditory content.

Figure 11:
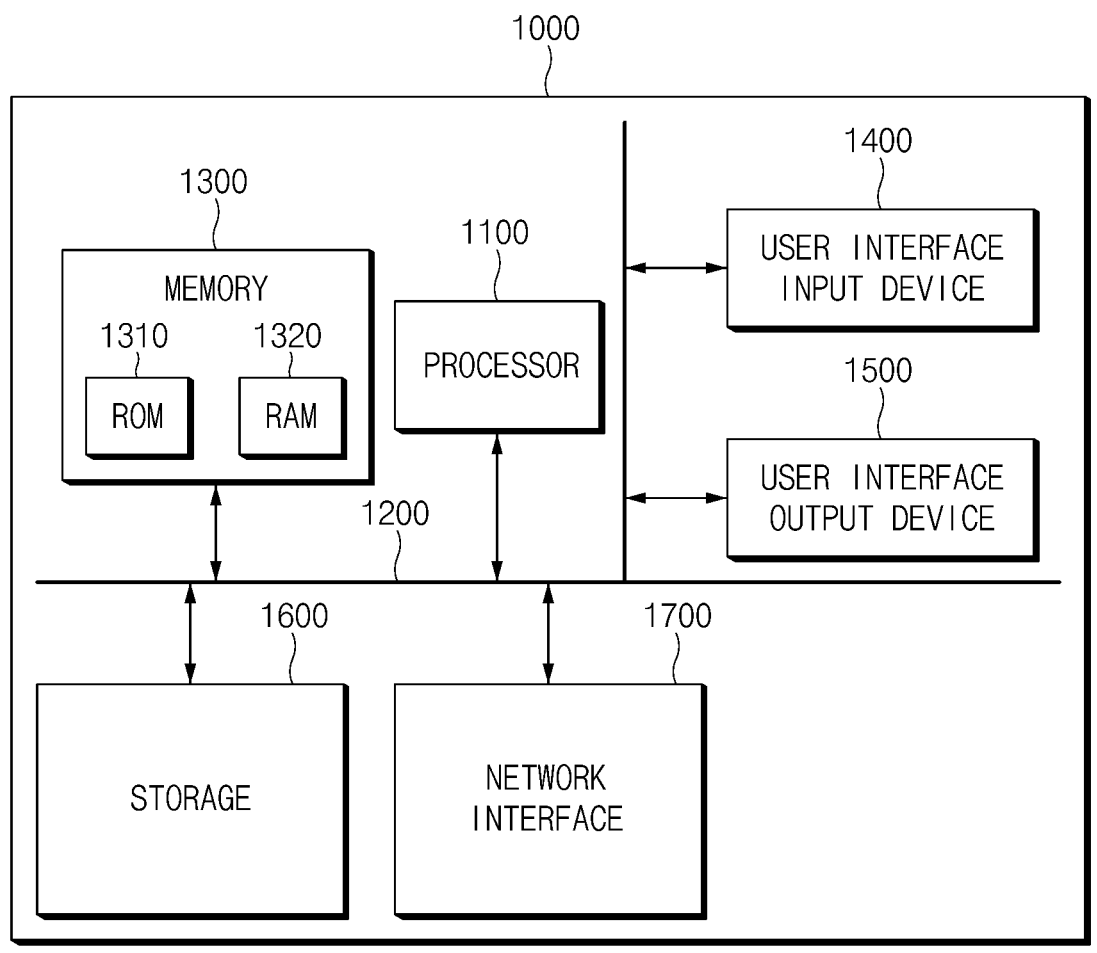
FIG. 11 shows a computing system related to an autonomous driving control method.

FIG. 11 shows a computing system related to an autonomous driving control method according to an embodiment of the present disclosure.

Referring to FIG. 11, a computing system 1000 related to the autonomous driving control method may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

Effects of the device and the method for controlling the autonomous driving according to the present disclosure will be described as follows.

According to at least one of the embodiments of the present disclosure, when identifying the situation in which the control must be transferred to the user while controlling the host vehicle based on the autonomous driving mode, the autonomous driving control device may transmit the notification regarding the transfer of the control to the user using at least some of the components arranged in advance.

In addition, according to at least one of the embodiments of the present disclosure, as the notification regarding the transfer of the control is transmitted using the components arranged in advance in the host vehicle, a manufacturing cost may be reduced.

In addition, according to at least one of the embodiments of the present disclosure, as parameters related to the travel environment of the host vehicle are not used, a consistent and comfortable riding feeling may be maintained.

In addition, various effects identified directly or indirectly through the present document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous driving control device comprising:
a notification device comprising at least one of: a seat belt length adjusting device or a seat angle adjusting device;
memory for storing one or more instructions; and
a controller operatively connected to the notification device and the memory,
wherein the one or more instructions, when executed by the controller, cause the autonomous driving control device to:
detect, while a host vehicle operates in an autonomous driving mode, an event that causes a determination of whether to transfer control of the host vehicle to a user;
output, at a first time and via the notification device, a first notification based on not receiving, within a first time period, a user response associated with the transfer of control;
output, via the notification device, a second notification based on not receiving, within a second time period starting at the first time, the user response associated with the transfer of control; and
control, after outputting the second notification, the host vehicle to reduce a travel speed of the host vehicle at a first rate.

2. The autonomous driving control device of claim 1, further comprising:
a display,
wherein the one or more instructions, when executed by the controller, further cause the autonomous driving control device to provide, via the display, information on at least one of: the event, the first notification, or the second notification.

3. The autonomous driving control device of claim 1, wherein the one or more instructions, when executed by the controller, cause the autonomous driving control device to output, via the notification device, the second notification further based on an occurrence, while the host vehicle operates in the autonomous driving mode, of at least one of: an error of the autonomous driving control device, or an unpredictable event.

4. The autonomous driving control device of claim 3, wherein the one or more instructions, when executed by the controller, cause the autonomous driving control device to control, after outputting the second notification, the host vehicle to reduce the travel speed of the host vehicle at a second rate greater than the first rate.

5. The autonomous driving control device of claim 1, wherein the one or more instructions, when executed by the controller, cause the autonomous driving control device to:
output the first notification by controlling, via the seat belt length adjusting device, a length of a seat belt during a third time period, wherein the third time period comprises a first retraction period, for contracting the length of the seat belt, and a first idle period; or
output the second notification by controlling, via the seat belt length adjusting device, the length of the seat belt during a fourth time period, wherein the fourth time period is less than the third time period, wherein the fourth time period comprises a second retraction period, for contracting the length of the seat belt, and a second idle period.

6. The autonomous driving control device of claim 1, wherein the one or more instructions, when executed by the controller, cause the autonomous driving control device to:
output, via the seat belt length adjusting device, the first notification by controlling a length of a seat belt with first intensity; or
output, via the seat belt length adjusting device, the second notification by controlling the length of the seat belt with second intensity greater than the first intensity.

7. The autonomous driving control device of claim 1, wherein the one or more instructions, when executed by the controller, cause the autonomous driving control device to:
output, via the seat angle adjusting device, the first notification by controlling an angle of a seat during a third time period; or
output, via the seat angle adjusting device, the second notification by controlling the angle of the seat during a fourth time period, wherein the fourth time period is less than the third time period.

8. The autonomous driving control device of claim 1, wherein the one or more instructions, when executed by the controller, cause the autonomous driving control device to:
output, via the seat angle adjusting device, the first notification by controlling an angle of a seat within a first range; or
output, via the seat angle adjusting device, the second notification by controlling the angle of the seat within a second range greater than the first range.

9. The autonomous driving control device of claim 1, wherein the one or more instructions, when executed by the controller, further cause the autonomous driving control device to turn off the notification device and deactivate the autonomous driving mode based on receiving, within the first time period or the second time period, the user response associated with the transfer of control.

10. The autonomous driving control device of claim 1, wherein the one or more instructions, when executed by the controller, further cause the autonomous driving control device to transmit a control signal for controlling the notification device, wherein the control signal comprises at least one of: a ramp-up signal, a step signal, or a sinusoidal signal.

11. The autonomous driving control device of claim 4, wherein the one or more instructions, when executed by the controller, further cause the autonomous driving control device to:

determine, based on the event, whether a seat belt of the user is fastened;

based on not receiving, within the first time period, the user response associated with the transfer of control:

output, via the notification device, the first notification based on a determination that the seat belt is fastened; and control the host vehicle to reduce the travel speed of the host vehicle at the second rate based on a determination that the seat belt is not fastened.

12. The autonomous driving control device of claim 1, wherein the one or more instructions, when executed by the controller, further cause the autonomous driving control device to:

receive, after outputting at least one of the first notification or the second notification, a manual seat angle adjustment input from the user; and deactivate the autonomous driving mode for the host vehicle based on a duration of the manual seat angle adjustment input exceeding a threshold time period.

13. The autonomous driving control device of claim 1, wherein the user response comprises at least one of, lasting over a threshold time period: manipulation of a steering wheel of the host vehicle, a pressure on a pedal of the host vehicle, a touch input on a display of the host vehicle, or a manual seat angle adjustment input.

14. A method for controlling autonomous driving, the method comprising:

detecting, by a controller and while a host vehicle operates in an autonomous driving mode, an event requiring a transfer of control of the host vehicle to a user;

outputting, by the controller via a notification device and at a first time, a first notification based on not receiving, within a first time period, a user response associated with the transfer of control;

outputting, by the controller via the notification device, a second notification based on not receiving, within a second time period starting at the first time, the user response associated with the transfer of control; and controlling, after outputting the second notification, the host vehicle to reduce a travel speed of the host vehicle at a first rate.

15. The method of claim 14, wherein the outputting of the second notification comprises outputting, via the notification device, the second notification further based on an occurrence, while the host vehicle operates in the autonomous driving mode, of at least one of: an error of an autonomous driving control device, or an unpredictable event.

16. The method of claim 15, wherein the outputting of the second notification further comprises:

controlling, by the controller and after outputting the second notification, the host vehicle to reduce the travel speed of the host vehicle at a second rate greater than the first rate.

17. The method of claim 14, wherein the outputting of the first notification comprises:

outputting, by the controller, the first notification by controlling, via a seat belt length adjusting device, a length of a seat belt during a third time period, wherein the third time period comprises a first retraction period, for contracting the length of the seat belt, and a first idle period; or outputting, by the controller, the second notification by controlling, via the seat belt length adjusting device, the length of the seat belt during a fourth time period, wherein the fourth time period is less than the third time period, wherein the fourth time period comprises a second retraction period, for contracting the length of the seat belt, and a second idle period.

18. The method of claim 14, wherein the outputting of the second notification comprises:

outputting, by the controller, the first notification by controlling a length of a seat belt with first intensity; or outputting, by the controller, the second notification by controlling the length of the seat belt with second intensity greater than the first intensity.

19. The method of claim 14, wherein the outputting of the first notification comprises:

outputting, by the controller, the first notification by controlling an angle of a seat during a third time period; or outputting, by the controller, the second notification by controlling the angle of the seat during a fourth time period, wherein the fourth time period is less than the third time period.

20. The method of claim 14, wherein the outputting of the second notification comprises:

outputting, by the controller, the first notification by controlling an angle of a seat within a first range; or outputting, by the controller, the second notification by controlling the angle of the seat within a second range greater than the first range.

* * * * *